(12) United States Patent
Barklund et al.

(10) Patent No.: US 7,295,966 B2
(45) Date of Patent: Nov. 13, 2007

(54) SYSTEM FOR NORMALIZING A DISCOURSE REPRESENTATION STRUCTURE AND NORMALIZED DATA STRUCTURE

(75) Inventors: Pär Jonas Barklund, Kirkland, WA (US); Michael V. Calcagno, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 10/047,472

(22) Filed: Jan. 14, 2002

(65) Prior Publication Data

US 2003/0171915 A1     Sep. 11, 2003

(51) Int. Cl.
*G10F 17/27* (2006.01)
(52) U.S. Cl. .............................. 704/9; 704/7
(58) Field of Classification Search ............ 704/9, 704/7
See application file for complete search history.

(56) References Cited

U.S. PATENT DOCUMENTS

| | | | |
|---|---|---|---|
| 5,794,050 A | 8/1998 | Dahlgren et al. | 395/708 |
| 5,873,056 A | 2/1999 | Liddy et al. | 704/9 |
| 6,052,682 A | 4/2000 | Bikel et al. | 707/3 |
| 6,076,051 A | 6/2000 | Messerly et al. | 704/9 |
| 6,112,168 A | 8/2000 | Corston et al. | 704/9 |
| 6,278,967 B1 * | 8/2001 | Akers et al. | 704/2 |
| 6,311,152 B1 | 10/2001 | Wu et al. | 704/9 |
| 6,389,405 B1 * | 5/2002 | Oatman et al. | 706/46 |
| 6,714,939 B2 * | 3/2004 | Saldanha et al. | 707/102 |

FOREIGN PATENT DOCUMENTS

EP       03000071.5       6/2003

OTHER PUBLICATIONS

From Discourse to Logic Introduction to Modeltheoretic Semantics of Natural Language, Formal Logic and Discourse Representation Theory. By: Hans Kemp et al. vol. 42, 1993 Relevant Chapters 1 and 2.
Disambiguation of Underspecified Discourse Representation Structures under Anaphoric Constraints by Michael Schiehlen Report 188, Jan. 1997.
Diana Maynard et al., "Named Entity Recognition from Diverse Text Types". 7 pages.
Weischedel et al., BBN: Description of the Plum System as Used for MUC-5, Aug. 25-27, 1993, Fifth Message Understanding Conference (MUC-5) pp. 93-107.
Official Notice of Rejection for Japanese Patent Application No. 2003-006415 mailed May 25, 2007.
Official Notice of Rejection for Japanese Patent Application No. 2003-001550 mailed Jun. 15, 2007.

* cited by examiner

*Primary Examiner*—Tālivaldis Ivars Šmits
(74) *Attorney, Agent, or Firm*—Westman, Champlin & Kelly, P.A.

(57) ABSTRACT

The present invention is a system and method for normalizing a discourse representation structure (DRS). The elements of the structure are rewritten and sorted in a way such that structures which may appear different but are nonetheless equivalent can be associated with the same, normalized representation. The present invention can also include a data structure for a DRS. The DRS is represented by an array of boxes, each having a set of elements which in turn has a predefined structure suitable for representing a wide variety of linguistic information.

13 Claims, 12 Drawing Sheets

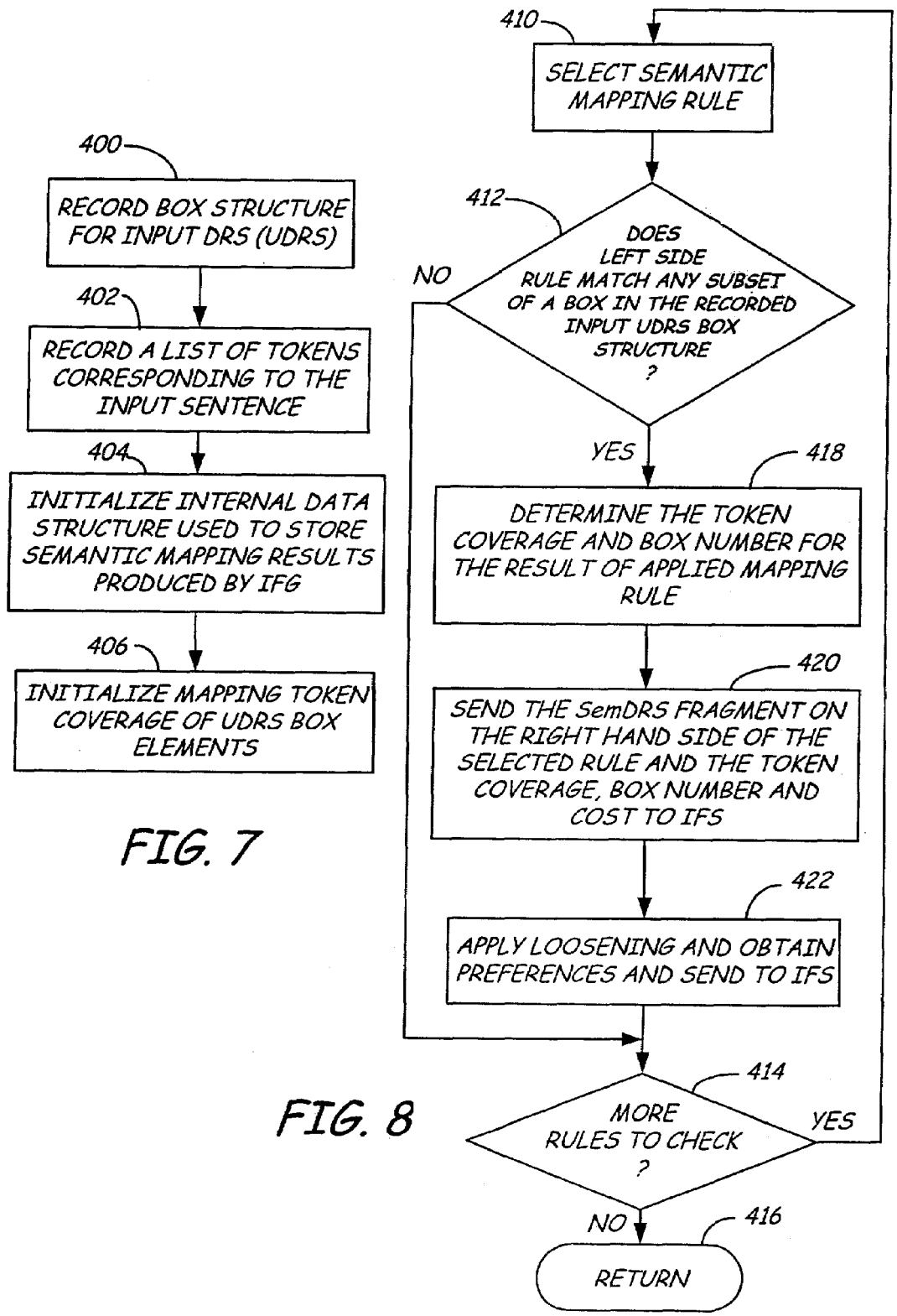

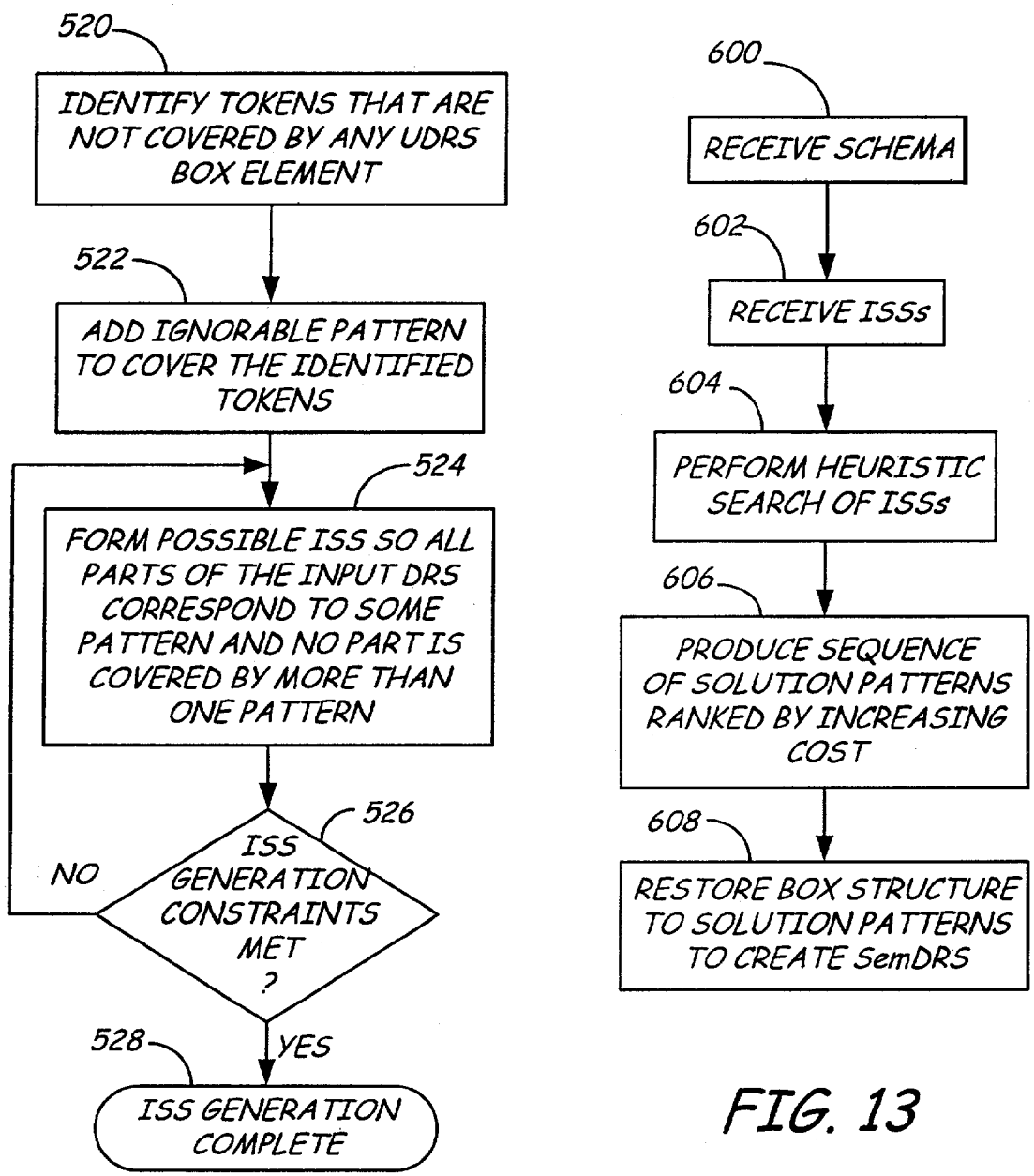

SYSTEM FOR NORMALIZING A DISCOURSE REPRESENTATION STRUCTURE AND NORMALIZED DATA STRUCTURE

BACKGROUND OF THE INVENTION

The present invention relates to semantic analysis of natural language material. More specifically, the present invention relates to the normalization of a linguistic structure provided by a natural language processing system.

Many applications would benefit from a natural language interface suitable to accept and accurately process natural language inputs from a user. Such natural language systems must be robust with respect to linguistic and conceptual variation. Consequently, they must be easy to use.

For example, natural language systems must be able to accommodate modifier attachment ambiguities, quantifier scope ambiguities, conjunction and disjunction ambiguities, nominal compound ambiguities, anaphora, elliptical sentences, etc.

In prior systems, a limited amount of semantic knowledge or heuristics were used to resolve ambiguities in the natural language input. However, these approaches can be undesirably complex or inefficient.

Even assuming that a natural language expression can be subjected to natural language processing and that a linguistic structure can be developed which represents the meaning of the natural language input, major hurdles must be overcome in order to use that linguistic structure with applications that expect inputs having a specific structure. For example, many conventional applications expect information to be input in a predefined structure, but that structure often differs from application-to-application. The output of many natural language processing systems is not a structure suitable for input to such applications.

Therefore, even assuming that a linguistic structure can be developed which represents the meaning of a natural language input, that does not mean that the linguistic structure is suitable for input to an application that desires to use information represented by the natural language input.

SUMMARY OF THE INVENTION

The present invention is a system and method for normalizing a discourse representation structure (DRS). The elements of the structure are rewritten and sorted in a way such that structures which may appear different but are nonetheless equivalent can be associated with the same, normalized representation.

The present invention can also include a data structure for a DRS. The DRS is represented by an array of boxes, each having a set of elements which in turn has a predefined structure suitable for representing a wide variety of linguistic information.

BRIEF DESCRIPTION OF THE DRAWINGS

FIG. 7 is a flow diagram illustrating, in greater detail, how the system is initialized.

FIG. 8 is a flow diagram illustrating the application of semantic mapping rules to the box structure of the UDRS.

FIG. 11-1 is a second exemplary UDRS block structure.

FIG. 12 is a flow diagram illustrating the generation of initial search states in accordance with one embodiment of the present invention.

FIG. 13 is a high level flow diagram illustrating the process of searching the initial search states to obtain solution patterns and SemDRS's in accordance with one embodiment of the present invention.

DETAILED DESCRIPTION OF ILLUSTRATIVE EMBODIMENTS

A. Overview

The present invention is a system and method for normalizing a discourse representation structure (DRS). It will be described in the context of a semantic analysis system and method that interprets a linguistic structure output by a natural language linguistic analysis system. The output from the semantic analysis system is a data structure model referred to as a semantic discourse representation structure (SemDRS). The present invention includes the overall process and architecture in addition to a number of the subprocesses and data structures. In order to better understand the present invention, one exemplary environment within which the present invention can be used will first be discussed. Of course, it will be appreciated that the present invention can be used in a wide variety of other systems and environments as well.

B. Illustrative Operating Environment

Figure 1:
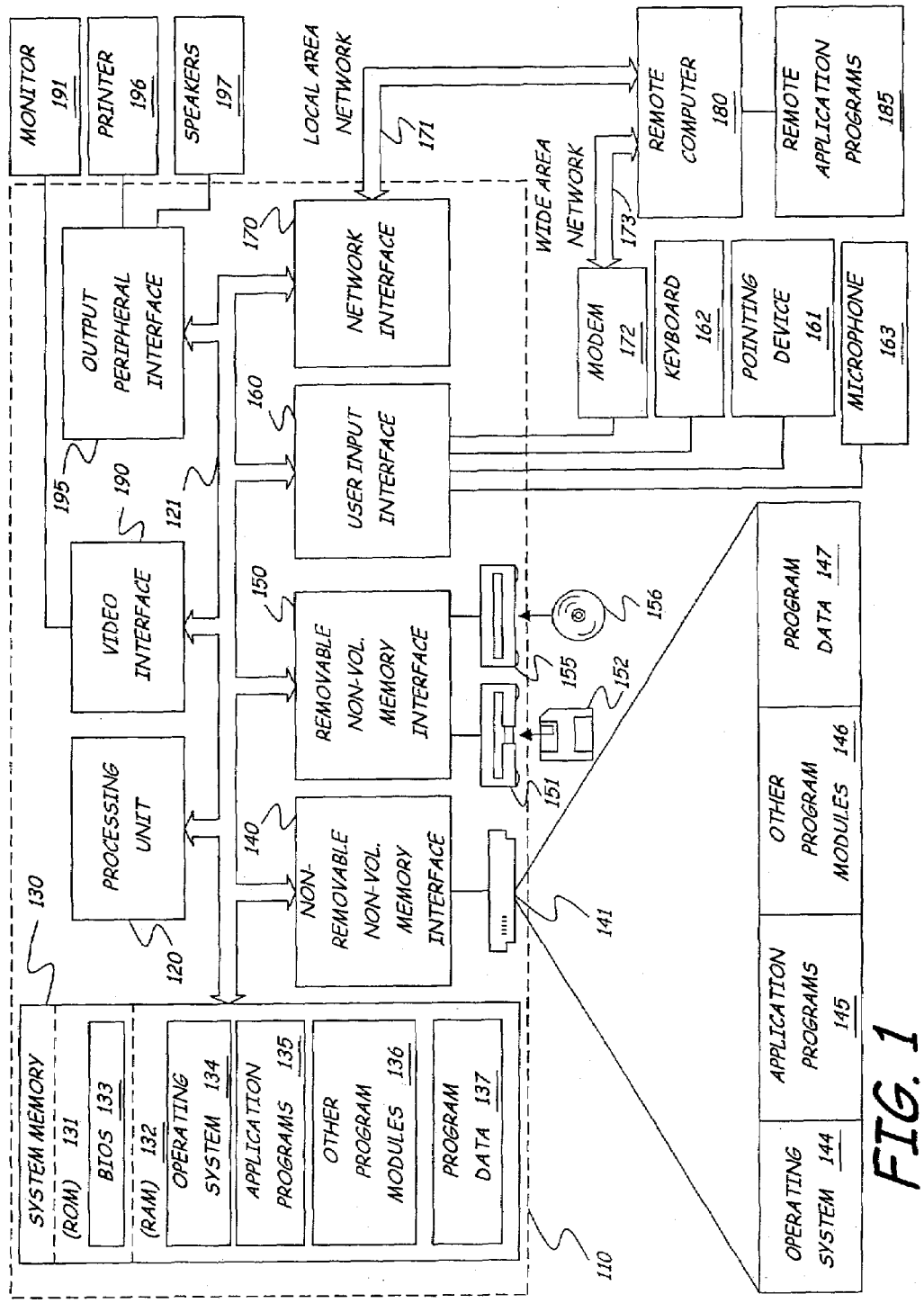
FIG. 1 is a block diagram of one illustrative embodiment of a computer in which the present invention can be used.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

C. Overview of Textual Processing System

Figure 2:
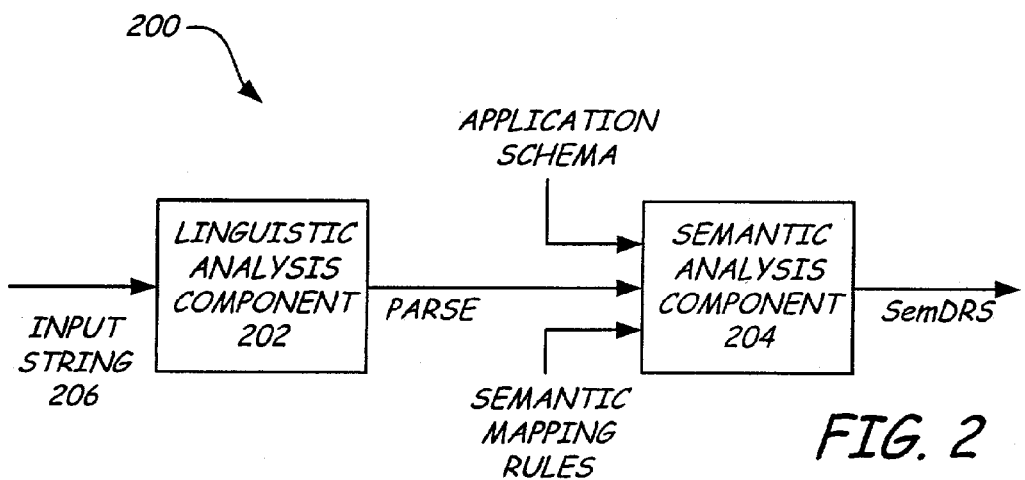
FIG. 2 is a block diagram of a textual analysis system in which the present invention can be used.

FIG. 2 is a block diagram of a textual processing system 200 in accordance with one embodiment of an environment for the present invention. Textual processing system 200 includes a linguistic analysis component 202 and a normalization of a DRS input to semantic analysis component 204. The present invention is directed to normalization of a DRS input to semantic analysis component 204 and the data structure of the normalized DRS, but is shown in the context of system 200 for the sake of example.

In system 200, a textual string 206 is input to linguistic analysis component 202. String 206 is illustratively an utterance, or any other type of natural language input which has been converted to text. Linguistic analysis component 202 analyzes input string 206 to produce a parse which includes, in one illustrative embodiment, a UDRS, a syntax parse tree, a logical form, a tokenized string, and a set of named entities. Each of these data structures is known, and will therefore be discussed only briefly. Linguistic analysis component 202 may illustratively output a plurality of different parses for any given textual input string 206, ranked in best-first order.

The UDRS is a linguistic structure output by the linguistic analysis component 202 and is discussed in greater detail with respect to FIG. 5. The syntactic parse tree and logical form graphs are also conventional dependency, and graph structures, respectively, generated by natural language processing in linguistic analysis component 202. The syntactic parse tree and logical forms are described in greater detail in U.S. Pat. No. 5,995,922, to Penteroudakis et al., issued on Nov. 30, 1999. The tokenized string is also conventional and is generated from input string 206. Any known tokenizer, which is configured to break input string 206 into its component tokens, and label those tokens, can be used to generate the tokenized string. Named entities are entities, such as proper names, which are to be recognized as a single unit. While named entities may differ widely in different domains, they generally correspond to noun phrases.

While only some of these elements of the parse may need to be provided to semantic analysis component 204, in one illustrative embodiment, they are all generated by (or obtained by) linguistic analysis component 202 and provided (as parts of the parse of string 206) to semantic analysis component 204.

Semantic analysis component 204 receives, as its input, the parse from syntactic analysis component 202, an application schema, and a set of semantic mapping rules. Based on these inputs, semantic analysis component 204 provides, as its output, one or more SemDRS's which represent the utterance indicated by input string 206 in terms of an entity-and-relation model of a non-linguistic domain (e.g., in terms of an application schema).

The application schema and semantic mapping rules are described in greater detail later in the application. Briefly, however, the application schema may illustratively be authored by an application developer. The application schema is a model of the application's capabilities and behavior according to an entity-and-relation model, with associated type hierarchy. The semantic mapping rules may also illustratively be authored by the application developer and illustrate a relation between input UDRS's and a set of SemDRS fragments. The left hand side of the semantic mapping rules matches a particular form of the UDRS's, while the right hand side specifies a SemDRS fragments which corresponds directly to a portion of the application schema. By applying the semantic mapping rules to the UDRS, and by maintaining a plurality of mapping and other data structures, the semantic analysis component 204 can generate a total SemDRS, having a desired box structure, which corresponds precisely to the application schema, and which also represents the utterance indicated by input string 206, and the UDRS input to the semantic analysis component 204.

D. Semantic Analysis Layer

1. Architecture

Figure 3:
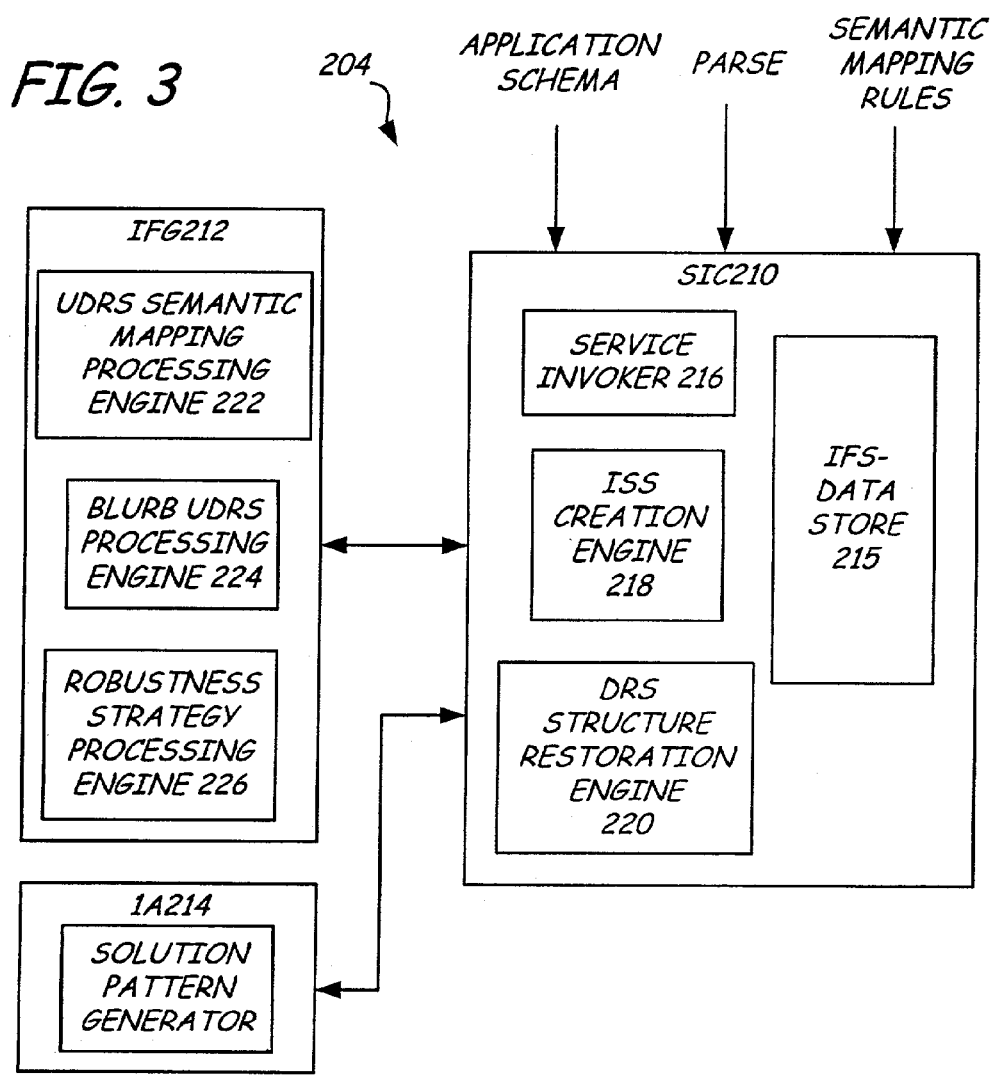
FIG. 3 is a more detailed block diagram of a semantic analysis system in accordance with one embodiment of the present invention.

FIG. 3 is a block diagram illustrating semantic analysis component 204 in greater detail. FIG. 3 shows that semantic analysis component 204 illustratively includes semantic interpretation controller (SIC) 210, interpretation fragment generator (IFG) 212, and interpretation assembler (IA) 214. SIC 210 includes a service invoker 216, an initial search state (ISS) generation component 218, a DRS structure restoration generator 220, and a data store 215 that contains all interpretation fragments and related information created by IFG 212. IFG 212 includes schema engine 222, Blurb UDRS processing engine 224, and robustness strategies processing engine 226. IA 214 includes solution pattern generation component 228.

SIC 210 controls the process of creating the output SemDRS interpretations from evidence provided by the linguistic analysis layer (linguistic analyzer 202) and also manages information that needs to be made available to various subcomponents of semantic analyzer 204.

The major components of interest that are input to SIC 210 will now be described in greater detail. These items will be described with respect to an example (Example 1) in which input string 206 (shown in FIG. 2) reads as follows: "Delete all e-mails not from KD."

2. Input DRS—Structure and Normalization

Figure 5A:
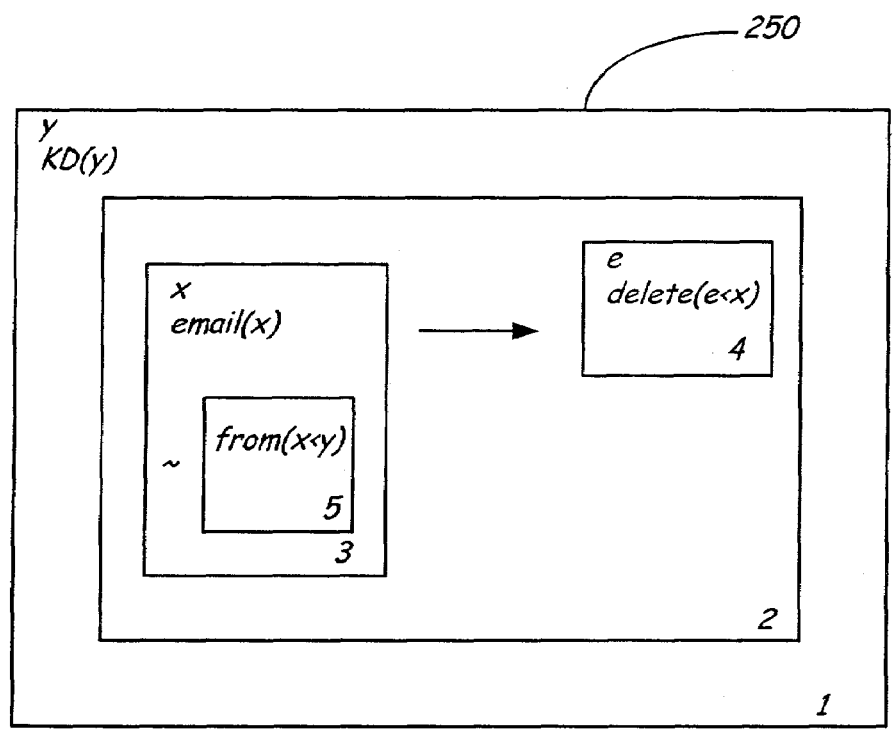
FIG. 5A is a diagram of a UDRS box structure.

FIG. 5A shows an input DRS (or UDRS) 250 which represents a linguistic analysis of the input string. UDRS 250 is a representation of entities being talked about in the input string, and the linguistic relationships that they stand in, in the input string. In the example input string, there are three modeled entities, or things, being discussed: a thing being deleted, a person named, KD, and the event of deleting. All of these logical elements are present in the box structure 250 shown in FIG. 5A. The box structure can be represented as a dynamic array, where each sub-box corresponds to an index in the array. Note that the indices into the DRS array are displayed in the lower right hand corner of each box in box structure 250. It should also be noted that the variable being quantified over (i.e., the variable associated with "mail" in the input string) is included as part of the logical structure.

In the box structure 250 shown in FIG. 5A, the variable y represents KD, the variable x represents a piece of electronic mail (i.e., an email), the term from (x,y) represents that the email (x) is from the entity (y). The variable e represents the act of deleting and the term "delete (e,x) indicates that the act of deleting e is to be executed on email (x). The arrow in the box structure 250 and the internal boxes in the box structure 250 represent that all x's (emails) that satisfy the conditions email and "not from" (note that the negation is represented by the tilde symbol on the upper left hand corner of the outside of box 5) are to have the action performed on them. In other words, in the specific example, the box structure and arrow indicates that all emails not from KD are to have the delete action performed on them (i.e, they are to be deleted).

DRS Representation

A more general and complete discussion of the data structures that embody a DRS and the method for normalizing such structures may be helpful. Of course, this is but one illustrative representation and normalization scheme.

A DRS can be thought of as a container for one or more boxes. Let k be the number of boxes in the DRS; each box then has a unique index that is a number between 0 and k−1, which is referred to as the box label.

A box has associated with it zero or more box elements. If n is the number of elements of a box, then each element has a unique index that is a number between 0 and n−1.

A box element can be a marker element, a constraint element, or a logical element. A marker element is a representation of an entity in discourse. A constraint element has zero or more arguments and some information about what the constraint is. In one embodiment, that information includes a tag that indicates the kind of the constraint at hand, a string value and a semantic value. A logical element, similarly, has zero or more arguments and information about what the logical operator is that is applied to those arguments.

A box element argument is a marker, the index of a box, or a data value.

In one embodiment, a DRS stores a vector of all its boxes and a vector of all its box elements in the record for the DRS. Each box contains a vector of indices of the elements that are part of that particular box. This makes it inexpensive to sort the elements of a box and makes it easier to traverse all box elements of a DRS, regardless of what box they belong to. Each box element contains a vector of its box element arguments.

For a normalized DRS there is also additional information that is maintained: the number of distinct markers in the DRS, a vector that associates each marker with a list of pairs of a box index and a box element index inside that box, and a string that is the normalized string representation of the DRS.

Helper Types

A marker is a (nonnegative) integer. In graphical presentations of DRSs it is helpful to map these integers to alphanumeric strings, but the internal representation is illustratively an integer.

A box index or box label is a (nonnegative) integer.

A BoxArgumentKind value is one of null_arg, arg_marker, arg_label, and arg_value.

A BoxElementKind is one of null_elem, elem_marker, elem_constraint, and elem_logical.

A BoxElementSemKind is one of a number of distinct values. Nothing in this disclosure depends on what these values are, but one implementation includes null_sem, sem_none, sem_entity, sem_relation, sem_value, and sem_dummy.

A Data value is an unspecified union type. Nothing in this disclosure depends on what the permitted range of Data values is, but one implementation includes a null value, Booleans, integers, and strings. Illustratively, there is a total ordering relation<over Data values. In one implementation, the null value precedes all other values, Booleans precede integers and strings, integers precede strings, false precedes true, integers are ordered conventionally and strings are ordered lexicographically.

A SemanticNode value is an integer. It is meant to be an index into an external data structure that represents a semantic domain.

Representation of Box Element Arguments

A box element argument is represented by a record having the following fields:

A BoxArgumentKind value m_kind.

An integer m_id.

A Data value m_data.

When a box element argument is created, m_kind is set. If it is arg_marker or arg_label, then m_id is set as well. If it is arg_value, then m_data is set as well.

An efficient and optional implementation can overlay the m_id and m_data fields as they will never be in use simultaneously.

Operations on Box Element Arguments

Let x be a box element argument.

x.kind() refers to the x.m_kind field.

x.marker() refers to the x.m_id field and may be used if x.m_kind is arg_marker.

x.label() refers to the x.m_id field and may be used if x.m_kind is arg_label.

X.data() refers to the x.m_data field and may be used if x.m_kind is arg_value.

Comparison operators $<_a$ and $<_b$ can also be used and are described below.

Representation of Box Elements

A box element is represented by a record having the following fields:

A BoxElementKind value m_kind.
A BoxElementSemKind value m_sem_kind.
A string m_word.
A SemanticNode value m_hnode.
An integer m_number_of_args.
A vector m_args of box element arguments, the length of which is given by m_number_of_args.

When a box element argument is created, m_kind must always be set.

If m_kind is elem_marker, then m_number_of_args is 1 and m_args[0] is an argument such that m_args[0].kind() is arg_marker.

If m_kind is elem_constraint, then m_sem_kind and m_number_of_args must always be set, and m_args must be initialized with m_number_of_args arguments. In one illustrative implementation, there is also a relationship between m_sem_kind, m_word and m_hnode:

If m_sem_kind is sem_none or sem_value, then m_word must be initialized with a string.

If m_sem_kind is sem_entity or sem_relation, then m_hnode must be initialized with a SemanticNode value.

m_number_of_args must also be set, and for each i, $0 \leq i < $ m_number_of_args, m_args[i] must be initialized to a box element argument.

An efficient and optional implementation can overlay the m_word and m_hnode fields as they will never be in use simultaneously.

One illustrative implementation has two additional fields that are not involved in the normalization operations. The information represented in these fields is used when establishing the semantics of a sentence. They include:

A list of integers m_tokens. This records (the positions of) the tokens in an input sentence that are covered by this particular box element.

A list of integers m_token_span. This records (the positions of) the tokens in an input sentence that are covered by the whole syntactic phrase of which this is the head.

Operations on Box Elements

Let x be a box element.

x.kind() refers to the x.m_kind field.
x.sem_kind() refers to the x.m_sem kind field.
x.word() refers to the x.m_word field and may be used if x.m_kind is elem_constraint and x.m_sem_kind is sem_none or sem_value.
x.schema_node() refers to the x.m_hnode field and may be used if x.m_kind is elem_constraint and x.m_sem_kind is sem_entity or sem_relation.
x.operator() refers to the x.m_word field and may be used if x.m_kind is elem_logical.
x.number_of_args() refers to the x.m_number_of_args field.
x.arg(i) refers to x.m_args[i], where $0 \leq i < $ x.m_number_of_args.
x.add_arg(y): let i be x.m_number_of_args; set x.m_args[i] to the box element argument y; add 1 to x.m_number_of_args; return i.
x.covered_tokens() refers to the x.m_tokens field.
x.phrase_token_span () refers to the x.m_token_span field. The comparison operators $<_a$ and $<_b$ discussed below can also be used.

Representation of Boxes

A box is represented by a record having the following fields:

A field m_ptr_containing_drs, which is a pointer to a DRS.
An integer m_number_of_elements.
An integer vector m_element_indices, the length of which is given by m number_of_elements.

When a box is created, m_ptr_containing_drs must be initialized with a pointer to the DRS in which the box resides or should reside. m_number_of_elements must also be initialized, and for each i, $0 \leq i < $ m_number_of_elements, m_args[i] must be initialized to a box element argument.

Operations on Boxes

Let x be a box.

x.number_of_elements() refers to the x.m_number_of_elements field.
x.element_index(i) refers to x.m_element_indices[i], where $0 \leq i < $ x.m_number_of_elements.
x.element(i) refers to x.m_ptr_containing_drs→m_elements [x.m_element_indices[i]], where $0 \leq i < $ x.m_number_of_elements.
x.add_element(y): let j be x.m_ptr_containing_drs→ m_number_of_elements; set x.m_ptr_containing_drs→ m_elements[j] to the box element y; add 1 to x.m_ptr_containing_drs→m_number_of_elements; let i be x.m_number_of_elements; set x.m_element_indices[i] to j; add 1 to x.m_number_of_elements; return i.
x.dominates(i) returns true if for some j, $0 \leq j < $ x.m_number_of_elements, x.element(j).kind() equals elem_logical or elem_constraint, and for some k, 0<k<x.element(j).number_of_args(), x.element(j).arg(k). kind()=arg_label and x.element(j).arg(k).label()=i, and false otherwise. It means that the box x (immediately) contains the box with label i.
x.dominates_star(i) returns true if x contains an element that has a box label j in some argument (see "dominates" above), and where either i=j, or x.m_ptr_containing_drs→box(j).dominates_star(i), and false otherwise. It means that the box x contains the box with label i, possibly indirectly.
x.retire() sets x.m_ptr_containing_drs to a null pointer. This is interpreted as the box no longer being in use, which is a useful operation when modifying a drs during analysis.
x.in_use() returns true if x.m_ptr_containing_drs is not a null pointer, and false otherwise.

See also the comparison operators $<_a$ and $<_b$ below.

Representation of a DRS

A DRS is represented by a record having the following fields:

An integer m_number_of_boxes.
A box vector m_boxes, the length of which is given by m_number_of_boxes.
An integer m_number_of_elements.
A box element vector m_elements, the length of which is given by m_number_of_elements.
An integer m_number_of_markers.
A normalized DRS also contains the following fields:
A vector m_marker_map of lists of pairs of integers, the length of which is given by m_number_of_markers.
A string m_key.

When a DRS is created m_number_of_boxes must be initialized to 1, and a single empty box put in m_boxes. In addition m_number_of_elements and m_number_of_markers must be set to 0.

Operations on a DRS

Let x be a DRS.

x.number_of_boxes() refers to the x.m_number_of_boxes field.

x.box(i) refers to x.m_boxes[i], where $0 \leq i <$ x.m_number_of_boxes.

x.number_of_elements() refers to the x.m_number_of_elements field.

x.element(i) refers to m_elements[i], where $0 \leq i <$ x.m_number of elements.

x.add_empty_box(): let i be x.m_number_of_boxes; set x.m_boxes[i] to an empty box; add 1 to x.m_number_of_boxes; return i.

x.add_box(y): ensure that y.m_ptr_containing_drs is the address of x; let i be x.m_number_of_boxes; set x.m_boxes[i] to y; add 1 to x.m_number_of_boxes; return i.

x.add_next_marker(i): let k be x.m_number_of_markers; add a marker element for marker k as the last element of x.box(i), cf "add_element" above; add 1 to x.m_number_of_markers; return k.

x.add_next_marker(i, j): let k be x.m_number_of_markers; add a marker argument for marker k as the rightmost argument of x.box(i).element(j), cf "add_arg" above; add 1 to x.m_number_of_markers; return k.

x.dominates(i,j): return x.box(i).dominates(j).

x.dominates_star(i,j): return x.box(i).dominates_star(j).

x.finalize(): invoke the normalization algorithm below; traverse the boxes, elements and arguments of x to produce a string key and store it in x.m_key; traverse the boxes, elements, and arguments of x and for each occurrence of a marker, add a pair <i,j> to the list for that marker in x.m_marker_map, where i is the box index and j is the index of the element in that box in which the marker appeared.

DRS Normalization Algorithm

The normalization algorithm modifies the internal representation of a given DRS so that, while it contains the same information, the markers, as well as the order between boxes and box elements, are normalized. Illustratively, the input to the algorithm is a DRS that may contain retired boxes and unreferenced box elements, and the sequence of marker IDs used may contain gaps. The output is a modified form of the input DRS, modified so that the order of boxes and of elements in boxes has been normalized, which means that the boxes of the DRS, as well as the elements of each box, satisfy the $<_b$ orderings defined below. Moreover, there are no unused boxes or box elements, and the markers of the DRS form an unbroken sequence beginning with 0.

A number of assumptions and terminology items will now be discussed. When in the descriptions below relating to how to determine orderings, the phrase " . . . , then x$<_a$y is false" or something similar is used, it means that the result of the comparison should be what is stated, and no further steps taken. When the phrase "sort vector[a . . . b] in place to satisfy $<_z$," is used, it means to apply an efficient sorting algorithm (such as the Quicksort algorithm discussed in C. A. R. Hoare, Quicksort. *Computer Journal*, 5(1):10-15, 1962) to the elements vector[a], vector[a+1], . . . , vector[b−1], vector[b], so that afterwards, if u<v, then it must not be the case that vector[v]$<_z$vector[u]. The sorting algorithm illustratively ensures that the result does not violate the given ordering, but if the ordering is not total, there may be more than one permitted result.

It is assumed that vectors are indexed beginning with 0, so a vector of size k have valid indices from 0 to k−1. When a vector is introduced, it is assumed that there is no initialization of its elements, unless explicitly specified. Similarly, the elements of a list are enumerated beginning from 0, so a list with k elements has them in positions 0 to k−1.

A marker occurrence triple is a triple <i,j,k> of integers, where i is a box number, j is an element number within that box and k is an argument position within that element. It represents an occurrence of a marker in that argument, or a marker element of a box in which case j and k will be 0.

Let $<i_1,j_1,k_1>$ and $<i_2,j_2,k_2>$ be marker occurrence triples. The truth of $<i_1,j_1,k_1><i_2,j_2,k_2>$ (read $<i_1,j_1,k_1>$ lexicographically precedes $<i_2,j_2,k_2>$) is defined as follows:

If $i_1<i_2$, then $<i_1,j_1,k_1><i_2,j_2,k_2>$ is true.

If $i_1=i_2$ and $j_1<j_2$, then $<i_1,j_1,k_1><i_2,j_2,k_2>$ is true.

If $i_1=i_2$, $j_1=j_2$, and $k_1<k_2$, then $<i_1,j_1,k_1><<i_2,j_2,k_2>$ is true.

If none of the three conditions above holds, $<i_1,j_1,k_1><<i_2,j_2,k_2>$ is false.

Let $L_1$ and $L_2$ be lists of marker occurrence triples. The truth of $L_1<L_2$ (read $L_1$ lexicographically precedes $L_2$) is defined as follows:

Let k be the largest number such that for every i, $0 \leq i < k$, neither t<u, nor u<t, holds, where t and u are the ith element of $L_1$ and $L_2$, respectively. (Then both $L_1$ and $L_2$ have at least k elements.)

If the number of elements in $L_1$ is k, then $L_1<L_2$ is false.

Otherwise, if the number of elements in $L_2$ is k, then $L_1<L_2$ is true.

Otherwise, $L_1<L_2$ is equivalent with t<u, where t and u are element k of $L_1$ and $L_2$, respectively.

A map from a type T to a type U is a data structure that allows efficient lookup of values of type T and returns a corresponding value of type U. It is said that it contains associations t→u where t is a value of type T and u is a value of type U. For each t of type T, there is at most one association t→u.

If m is a map from T to U, then the expression m[e], where e is of type T, is of type U. If m contains an association t→u, and the value of e is t, then the value of m[e] is u. If m contains no association for t, then the value of m[e] is undefined. There are many well-known data structures for implementing maps efficiently, for example red-black trees (such as discussed in R. Bayer, Symmetric binary B-trees: Data structure and maintenance algorithms. *Acta Informatica*, 1:290-306, 1972) and hash tables (such as discussed in D. E. Knuth. *Sorting and Searching*, Vol. 3 of *The Art of Computer Programming*. Addison-Wesley, 1973).

A multimap from type T to type U is similar to a map from T to U except that it may contain more than one association t→u for each t in T. A multimap from T to U is also similar to a map from T to sets of values of type U but there is no distinction between a map that associates an empty set with a value t and a map that associates no set with t.

The following two ordering relations between boxes, $<_a$ and $<_b$ are defined. They are defined recursively in terms of corresponding ordering relations between box element and between box element arguments and for convenience those ordering relations are also referred to as $<_a$ and $<_b$. It will always be clear from the context whether the ordering is over boxes, box elements or box element arguments. When two boxes, two box elements, or two box element arguments are compared, they will always belong to the same DRS. Finally, orderings $<_a$ and $<_b$ over the indices of the boxes in a DRS are defined in terms of the orderings over the boxes themselves.

■$_a$ Over Box Element Arguments

The relation $<_a$ between box element arguments x and y in a DRS is defined according to the matrix in Table 1:

TABLE 1

| $<_a$ for box element | | y.kind( ) | | | |
|---|---|---|---|---|---|
| arguments | | null_arg | arg_marker | arg_label | arg_value |
| x.kind ( ) | Null_arg | false | true | true | true |
| | Arg_marker | false | false | true | true |
| | Arg_label | false | false | See (a) below | true |
| | Arg_value | false | false | false | See (b) below |

(a) If x.kind( ) and y.kind( ) are arg_label, then x $<_a$ y is equivalent with drs.box(x.label( )) $<_a$ drs.box(y.label( )).
(b) If x.kind( ) and y.kind( ) are arg_value, then x $<_a$ y is equivalent with x.data( ) < y.data( ), where < is the total ordering over Data values. $<_b$ over box element arguments The relation $<_b$ between box element arguments x and y in a DRS is defined according to the matrix in Table 2:

TABLE 2

| $<_b$ for box element | | y.kind( ) | | | |
|---|---|---|---|---|---|
| arguments | | Null_arg | arg_marker | arg_label | arg_value |
| x.kind ( ) | Null_arg | False | true | true | True |
| | Arg_marker | False | See (c) below | true | True |
| | Arg_label | False | false | See (d) below | True |
| | Arg_value | False | false | false | See (b) above |

(c) If x.kind( ) and y.kind( ) are arg_marker, then x $<_b$ y is equivalent with x.marker( ) < y.marker( ).
(d) if x.kind( ) and y.kind( ) are arg_label, then x $<_a$ y is equivalent with x.label( ) $<_a$ y.label( ). It should be noted that drs.box(x.label( )) $<_a$ drs.box (y.label( )) could have been used as in (a) but any time $<_b$ is applied, it is known that these tests are equivalent, and the integer comparison x.label( ) $<_a$ y.label( ) is more efficient.

$<_a$ Over Box Elements

The relation $<_a$ between box elements x and y in a DRS is defined according to the matrix in Table 3:

TABLE 3

| $<_a$ for box elements | | y.kind( ) | | | |
|---|---|---|---|---|---|
| | | null_elem | elem_marker | elem_constraint | Elem_logical |
| x.kind ( ) | Null_elem | false | true | True | True |
| | Elem_marker | false | false | true | True |
| | Elem_constraint | false | false | See (e) below | True |
| | Elem_logical | false | false | false | See (e) below |

(e) If x.kind( ) and y.kind( ) are both elem_constraint, or both elem_logical, then x $<_a$ y is determined by the following steps:

Step 1. Let $n_x$ = x.number_of_args( ) and $n_y$ = y.number_of_args. If $n_x < n_y$, then x $<_a$ y is true. If $n_x > n_y$, then x $<_a$ y is false. Otherwise, proceed to the next step.

Step 2. Let $s_x$ = x.sem_kind( ) and $s_y$ = y.sem_kind( ). If $s_x < s_y$, then x $<_a$ y is true. If $s_x > s_y$, then x $<_a$ y is false. Otherwise, proceed to the next step.

Step 3. If $s_x$ and $s_y$ are not null_sem, no_sem or value, proceed to the next step. Otherwise, compare x.word( ) and y.word( ) in lexicographic order. If x.word( ) precedes y.word( ), then x $<_a$ y is true. If y.word( ) precedes x.word( ), then x $<_a$ y is false. If neither, proceed to step 5.

Step 4. If $s_x$ and $s_y$ are not entity or relation, proceed to the next step. Otherwise, compare x.schema_node( ) and y.schema_node( ). If x.schema_node( ) precedes y.schema_node( ), then x $<_a$ y is true. If y.schema_node( ) precedes x.schema_node( ), then x $<_a$ y is false. If neither, proceed to the next step.

Step 5. We know box elements x and y have the same number of arguments ($n_x$ and $n_y$ above). Set the integer variable i to 0.

Step 6. If i = $n_x$, then x $<_a$ y is false. Otherwise, let a and b be the arguments in position i of box elements x and y, respectively. If a $<_a$ b, then x $<_a$ y is true. Otherwise, is b $<_a$ a, then x $<_a$ y is false. Otherwise, increase i by 1 and repeat this step.

$<_a$ Over Box Element IDs

The relation $<_a$ between box element IDs i and j in a DRS is determined by determining the relation $<_a$ between the box elements with ID i and j, respectively, of DRS.

$<_b$ Over Box Elements

The relation $<_b$ between box elements x and y in a DRS is defined according to the matrix in Table 4:

TABLE 4

| $<_b$ for box | y.kind( ) | | | |
|---|---|---|---|---|
| elements | null_elem | Elem_marker | elem_constraint | elem_logical |
| x.kind  null_elem | false | true | true | true |
| ( )  elem_marker | false | See (f) below | true | true |
| elem_constraint | false | false | See (g) below | true |
| elem_logical | false | false | false | See (g) below |

(f) If x.kind( ) and y.kind( ) are elem_marker, then x $<_b$ y is equivalent with x.marker( ) < y.marker( ).
(g) If x.kind( ) and y.kind( ) are both elem_constraint, or both elem_logical, then x $<_b$ y is determined exactly as in (e) for x $<_a$ y above, with the exception that in Step 6, the comparison between box element arguments a and b is done using $<_b$.

$<_a$ Over Boxes

The relation $<_a$ between boxes x and y in a DRS is computed using the following steps:

Step 1. If y is drs.box(0), then x$<_a$y is false. Otherwise, if x is drs.box(0), then x$<_a$y is true. Otherwise, if DominatesStar(x, y), then x$<_a$y is true. Otherwise, if DominatesStar(y, x), then x$<_a$y is false. Otherwise, let $n_x$ and $n_y$ be the number of elements in boxes x and y, respectively, set the integer variable i to 0, and proceed to the next step.

Step 2. If i=$n_x$, then x$<_a$y is false. Otherwise, if i=$n_y$, then x$<_a$y is true. Otherwise, let a and b be element i of boxes x and y, respectively. If a$<_a$b, then x$<_a$y is true. Otherwise, if b$<_a$a, then x$<_a$y is false. Otherwise, increase i by 1 and repeat this step.

$<_a$ Over Box IDs

The relation $<_a$ between box IDs i and j in a DRS is determined by determining the relation $<_a$ between the boxes with ID i and j, respectively, of DRS.

$<_b$ Over Boxes

The relation $<_b$ between boxes x and y in a DRS is determined exactly as for x$<_a$y above, with the exception that in Step 6, the comparison between box element arguments a and b is done using $<_b$.

■$_b$ Over Box IDs

The relation $<_b$ between box IDs i and j in a DRS is determined by determining the relation $<_b$ between the boxes with ID i and j, respectively, of DRS.

Given the above discussion, it can be seen that the $<_a$ ordering sorts without regard to markers while the $<_b$ ordering sorts with respect to markers as well.

The Normalization Algorithm

The normalization algorithm can be understood as having several stages. In the first stage, any unused boxes and box elements are purged from the DRS. In the second stage, a preliminary ordering that ignores markers is imposed on the boxes and the elements of boxes. (Boxes and box elements differing only in markers are treated as if they were equivalent.) Based on that preliminary ordering, an ordering is established for the markers, and the markers are renumbered in a continuous sequence. Finally, a definitive ordering is imposed on the boxes and box elements, based on the preliminary ordering and the ordering of markers. The ordering over markers is not uniquely determined but we have the nice property that regardless of which permissible marker ordering is chosen, after the final renumbering, the result will be the same.

Figure 5B:
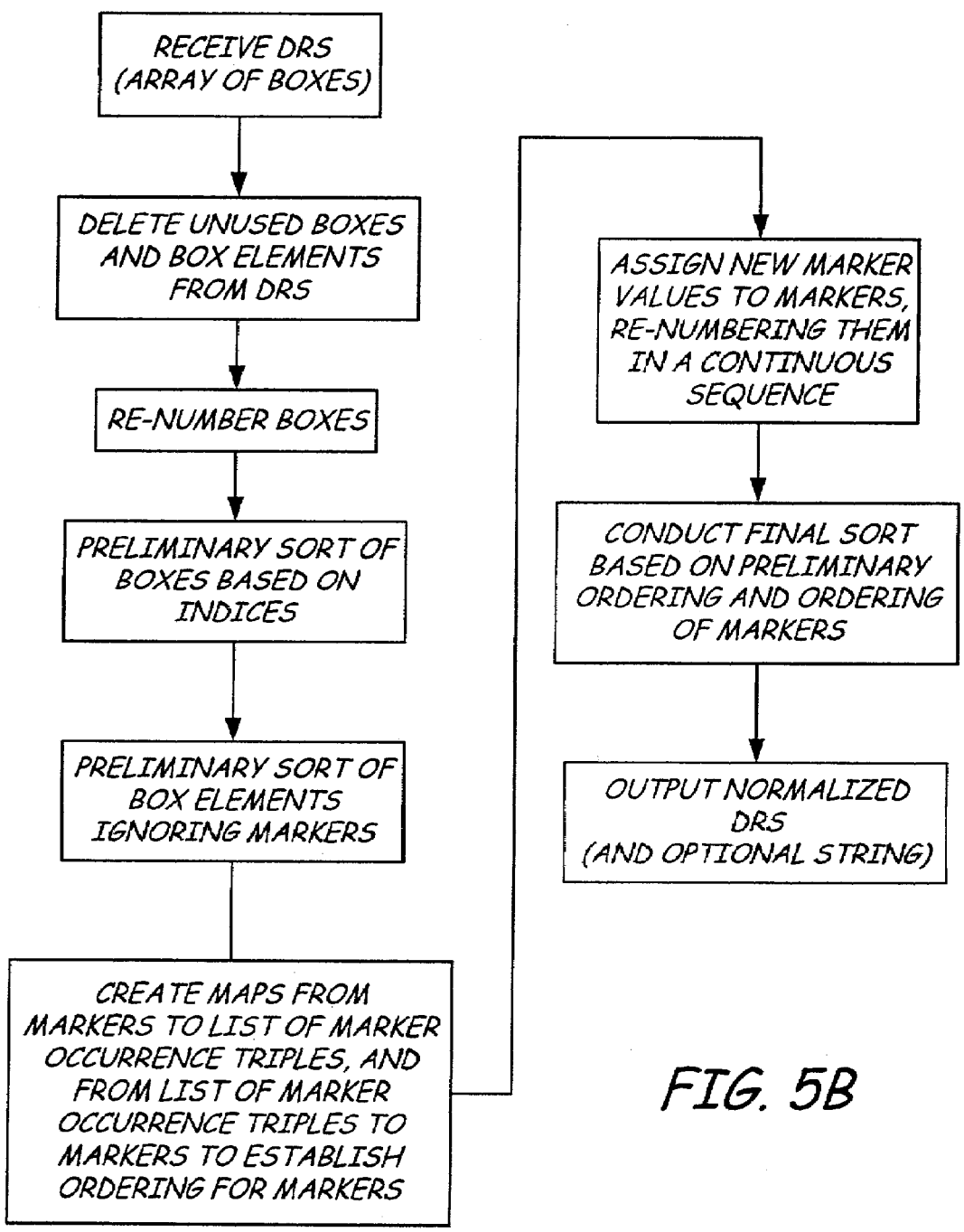
FIG. 5B is a flow diagram illustrating normalization of a UDRS.

FIG. 5B is a flow diagram illustrating how the various DRS structures which are generated are normalized for later processing. It should be noted that normalization of the input DRS can be performed by syntactic analysis component 202 or semantic analysis component 204 or some other external component. However, it may illustratively be performed by SIC 210 in semantic analysis component 204. It should also be noted that the pseudo code for the process shown by the algorithm in FIG. 5B is included herein as Appendix A, and some references will be made to Appendix A throughout the discussion of FIG. 5B.

First, the normalization component (wherever it may reside) receives the input DRS (i.e., the array of boxes). This is indicated by block 251.

Occasionally, during creation of the input DRS, boxes or box elements may be included which are not used. Therefore, the unused boxes and box elements in the DRS are identified and deleted as indicated by block 253. The remaining boxes are then renumbered as indicated by 255. Deleting the unused boxes and renumbering those boxes is illustrated by step 1 in Appendix A.

Next, a preliminary sort of the boxes is performed based on the box indices. This is indicated by blocks 257 in FIG. 5B.

After the boxes are preliminarily sorted based upon their indices, a preliminary sort is performed of the box elements, ignoring the markers in the box elements. This preliminary sort is conducted in steps 3-7 in Appendix A and is indicated by block 259 in FIG. 5B. More specifically, in step 3, the algorithm performs a$<_a$ sort over the box element ids. The box elements are then rearranged according to the sort and storage space which was previously occupied by boxes or unused boxes is released. This is performed in steps 4 and 5 in Appendix A. Once the box elements have been sorted and rearranged, the boxes themselves are updated such that they have the correct box elements again. This is preformed in step 6 of the algorithm in Appendix A. Similarly, the box elements themselves are then updated such that they refer to the correct boxes again. This is preformed in step 7 of the algorithm.

It can be seen that after the first seven steps of the algorithm in Appendix A, and after the preliminary sort of boxes based on box indices as set out in block 257 and the preliminary sort of box elements (ignoring markers) as set out in block 259 in FIG. 5B the boxes and elements have been completely sorted, ignoring markers. This means that each of the boxes and box elements has been sorted according to the lexicographic sorting and comparison algorithms discussed above. The only boxes and box elements that have not been completely sorted are those which differ only with respect to markers. Such boxes and box elements are ranked as equivalent at this point in the algorithm.

Steps 8-11 are then performed by passing through the DRS to obtain information and data structures necessary to perform a final sort. In the final sort, not only are the boxes and box elements sorted according to indices, but are also sorted according to markers. The algorithm thus begins giving unique consecutive values to the markers. However, during this process, it is desirable that any identity between markers and elements or boxes is not lost. Thus, steps 8 and 9 record maps which maintain this identity.

In step 8, maps are created from markers to lists of marker occurrence triples for marker elements, constraints and logical elements. It can be seen that the order in which marker occurrence triples are added to the lists in the map ensures that each list is order lexicographically on the triples.

Step 9 creates inverse maps from lists of marker occurrence triples to markers to establish an ordering for the markers. Creating the maps is indicated by block 261 in FIG. 5B.

Once the maps are created to maintain identity, new marker values are assigned to the markers and the elements are updated with the new marker values. This is indicated by block 263 in FIG. 5B. Assignment of new marker values to the markers is performed by step 7 in Appendix A and updating the elements with the new marker values (thus renumbering them in a continuous sequence) is performed by step 11 in Appendix A.

Finally, a final sort is performed based on the preliminary orderings as well as the ordering of the markers. This is indicated by block 265 in FIG. 5B and is further illustrated by step 12 in Appendix A. The output is a DRS which has been modified so that the order of boxes and of elements in boxes has been normalized. This means that the boxes of the DRS, as well as the elements of each box, satisfy the $<_b$ orderings defined above. Moreover, there are no unused boxes or box elements, and the markers of the DRS form an unbroken sequence beginning with zero.

The Key String

A procedure can be implemented that, given a DRS in this representation structure, outputs a string that stands in a 1-to-1 relationship with the DRS. For a normalized DRS, that string is correspondingly normalized. An inverse procedure can be implemented that, given a normal string representation of a DRS, produces a DRS in the present representation structure that is indistinguishable from the original DRS. There are several advantages to having such a serialized normal representation, for example:

The strings can be persisted in files or databases, or transmitted over serial streams. The reader of such a file or database, or the recipient of such a stream, can recreate the original normalized DRS.

The strings can be used as keys in a database system.

The strings can be compared efficiently for equivalence (and other suitable relations) using standard string utilities.

Such a procedure includes a recursive traversal of the DRS, and production of a string that describes compactly and unambiguously the boxes, box elements, and box element arguments encountered.

The inverse procedure includes parsing such a string and recreating the DRS box by box, box element by box element, and box element argument by box element argument.

3. Application Schema

Figure 6:
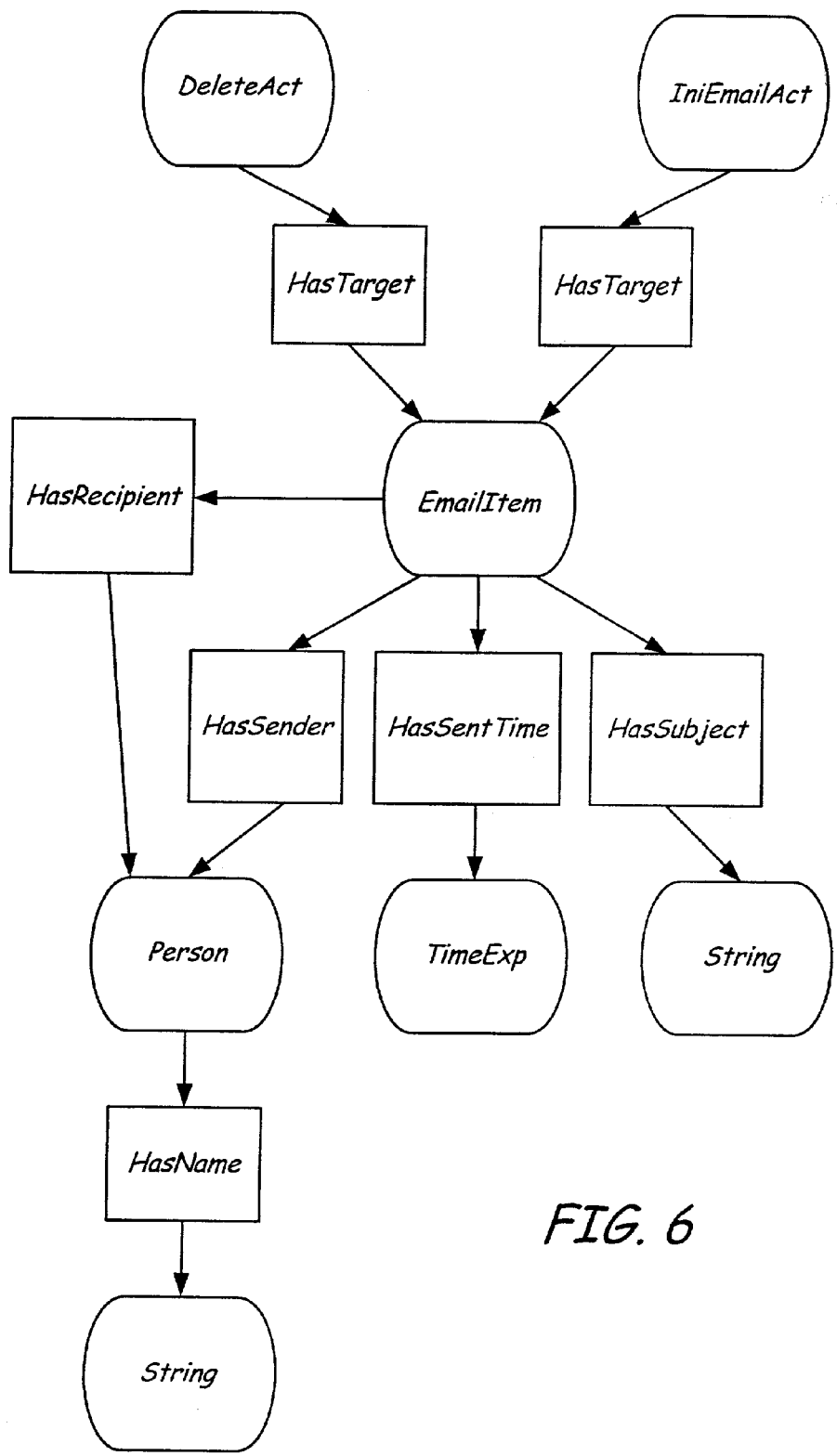
FIG. 6 illustrates one exemplary application schema.

FIG. 6 represents a schema 300 suitable for the present example. The schema 300 is a graph of entities and relations where entities are shown in circles (or ovals) and relations are shown in boxes. For example, the schema 300 shows that the application supports sending and deleting various specific email messages. This is shown because email items can be the target of the "DeleteAct" or the "InitiateEmailAct".

Further, those email messages can have senders or recipients designated by a "Person" who has a "Name" indicated by a letter string. The email items can also be specified by the time they were sent and by their subject, which in turn is also represented by a character string.

The job of the semantic analysis component 204 of the present invention is to receive the parse (which includes the UDRS box structure shown in FIG. 5) and interpret it precisely in terms of the application schema 300 shown in FIG. 6. This interpretation can then be passed to the application where it will be readily understood. In order to do this, semantic analysis component 204 first applies semantic mapping rules to the UDRS.

4. Semantic Mapping

A semantic mapping is a relation between a set of UDRS's and a set of SemDRS fragments. A semantic mapping rule is an expression with a left hand side that matches subparts of UDRS's of a particular form and a right hand side that specifies a certain SemDRS fragment. Additionally, the rule contains a correspondence that for each position in the left hand side that matches a marker, a corresponding right-hand side position is identified, unless the variable should simply be dropped out. Syntactically, this correspondence can be represented simply by using the same markers on both sides of the mapping rule. The semantic mapping rule can thus be used for rewriting a UDRS to a set of SemDRS fragments.

A set of semantic mapping rules denotes the semantic mapping, such that for some rule in the set, if its left hand side matches a subpart of the UDRS and its right hand side is the SemDRS fragment with the corresponding variables substituted from the UDRS, then a component of the semantic mapping will be the relationship between the input UDRS on the left hand side and the SemDRS fragment on the right hand side. Of course, if more than one rule in a set applies to a UDRS, then there is more than one possible result of applying the semantic mapping denoted by the rule set.

In one illustrative embodiment, many of the semantic mapping rules will be on the form [|word(x)]→[|type(x)], such as:

[|message(x)]→[|MailItem(x)]
[|email(x)]→[|MailItem(x)]
[|email(e,x,y)]→[|InitiateEmailAction(e)]

In an illustrative embodiment, a general case of a semantic mapping rule is able to match an arbitrary UDRS on the left hand side. For example, the general case illustratively looks for a certain configuration of boxes and logical operators. The right hand side is also able to specify an arbitrary SemDRS, again illustratively including (perhaps nested) boxes and logical operators. Finally, the variable correspondence is illustratively general enough to allow the number of occurrences of markers to change from the left hand side to the right hand side. Examples of more general rules are as follows:

[|make(e,x, [font (y), bold (y)])→[|AlterFont(e), Alters (e,z), HasNewProperty(z,y), Boldface (y)]; and

[|~[save(e,x,y)], mail(y)]→[|DeleteMailAction(e), HasTarget (e,y), MailItem(y)].

As these examples illustrate, it is sometimes desirable to try to match more than one word in any given semantic mapping rule. There are two cases that are illustratively treated somewhat differently:

First semantic mapping rules can be generated for particular sequences of words, possibly normalized with respect to case, stemming, etc. This applies to words such as "hot dog" or a person's proper name which includes first and last name.

Second, semantic mapping rules can be generated for words that appear in a certain syntactic configuration, as in the two immediately preceding examples. Under the first case, if the sequence of words appears as a multi-word entity in a lexicon, then it is a single lexical unit and its semantic mapping is handled in the same way as for a single word. Also, if the sequence of words is a named entity, then the semantic rules also deal with it as a single unit.

The semantic mapping rules can illustratively be authored by the application developer, or they can be generated based on sufficient input from the application developer and by inducing them from the schema.

E. Overall Operation of Semantic Analysis Layer

The information received by SIC 210 is all made available to IFG 212 and the semantic mapping and application schema, along with the data in data store 215 is made available to IA 214. In order to invoke the services of IFG 212 (and its various subcomponents) and IA 214 (and its various subcomponents) SIC 210 includes service invoker 216 which marshals data among the various components in the system. Based on this information, IFG 212 produces interpretation fragments which are made available to SIC 210 and then stored in data store 215. There are three different basic types of interpretation fragments, including those generated by applying semantic mapping rules to the UDRS, those generated by interpreting elements in the input as a string, known hereinafter as Blurbs, and those generated through robustness strategies. The mechanism by which the first type of interpretation fragments are generated may illustratively be largely language-independent, while the last two may illustratively be produced by language-dependent reasoning about the tokenized string, the syntax parse tree, the logical form and the named entities. The interpretation fragments are written back to data store 215 through an interface that SIC 210 makes available to IFG 212.

Based on the interpretation fragments, SIC 210 generates patterns and initial search states at ISS creation component 218. The initial search states correspond to partially comlpete SemDRS structures with the logical and box structure removed. The initial search states, along with preferences for how to assemble the interpretation fragments (or patterns) embodied in the initial search states are provided to IA 214.

IA 214 outputs a set of solutions patterns. The solution patterns are converted into totally interpreted SemDRS's by restoring their logical and box structure, if possible. This is done by DRS structure restoration generator 220, and the totally interpreted SemDRS's are output by SIC 210.

F. More Detailed Operation of Semantic Analysis Layer

Figure 4:
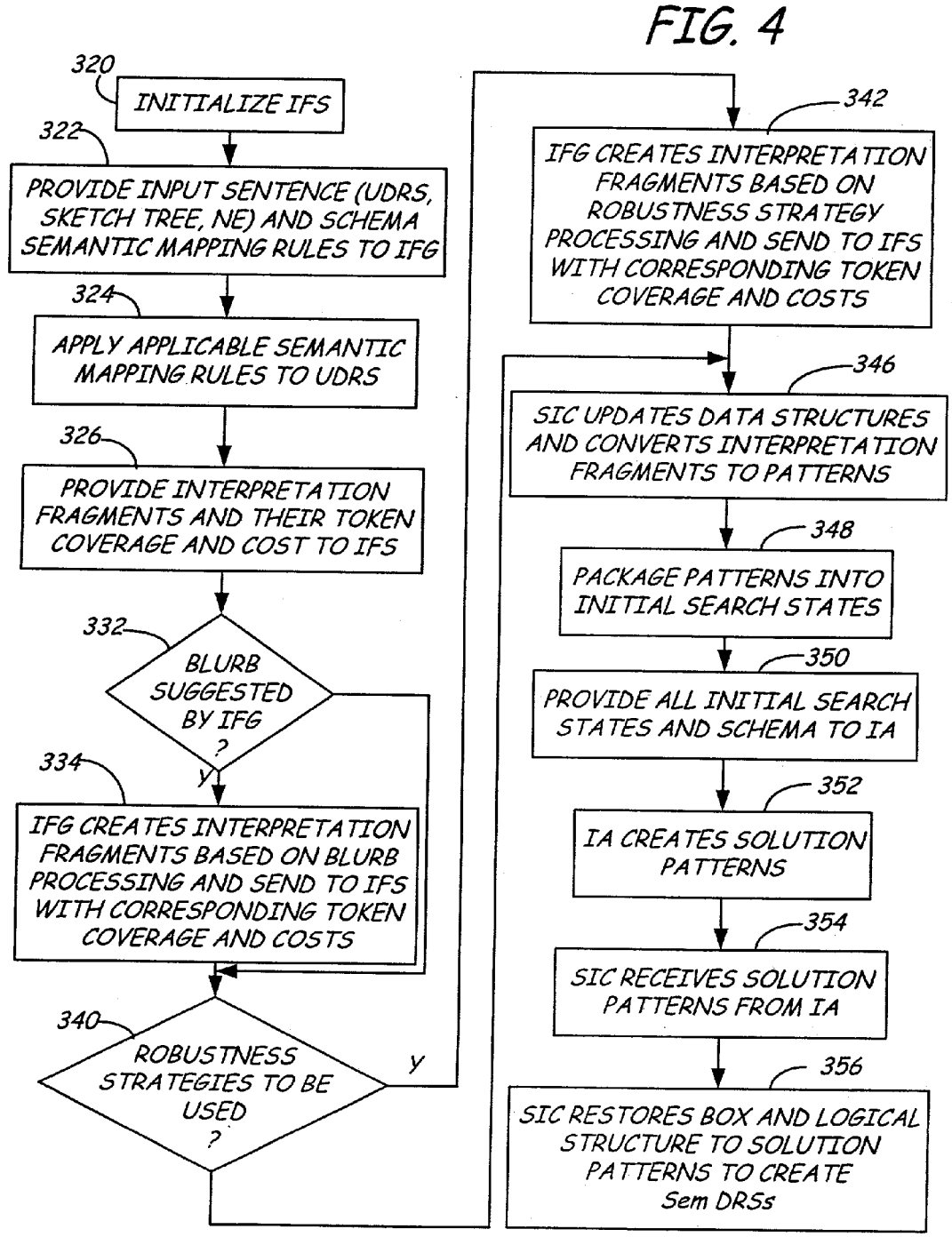
FIG. 4 illustrates a flow diagram generally showing the processing of a parse (including a UDRS) in accordance with one embodiment of the present invention.

FIG. 4 shows a flow diagram which better illustrates the overall data flow in semantic analysis component 204. Many of these blocks are, in turn, described in greater detail with respect to later figures in the detailed description.

SIC 210 first receives the parse, application schema and semantic mapping rules and initializes data store 215 which will be maintained within SIC 210. This is indicated by block 320 in FIG. 4. Data store 215 includes the UDRS, which is a record of the logical and box structure of the input DRS, and gets updated whenever a semantic mapping rule licenses a change in this structure. The data structures also include:

A token list which is a list of tokens in the original sentence.

A set of SemDRS fragments with the tokens they cover, their associated costs, and the original box that they should be put into when restoring the DRS logical and box structure. These fragments are all created by the different subcomponents in IFG 212. These SemDRS fragments become the core members of the initial search states that are input to IA 214.

Preferences which are instructions for how patterns in initial search states are to be joined to obtain solution patterns.

Data store 215 provides necessary interfaces for the other components in the system to access, add to, or update the data in the data store 215.

Once the data store 215 is initialized, service invoker 216 in SIC 210 provides the input sentence and the semantic mapping rules to IFG 212 and invokes the services of IFG 212. This is indicated by block 322 in FIG. 4.

Next, UDRS semantic mapping processing engine 222 in IFG 212 applies all applicable semantic mapping rules to the UDRS. This is indicated by block 324. It should be noted that these rules can be constructed at compile time or constructed from other rules and the schema at run time. The result of the application of the semantic mapping rules is a set of interpretation fragments that specify a mapping between a set of UDRS box elements and a set of SemDRS box elements. The token coverage of these interpretation fragments are defined as the set of tokens in the input sentence corresponding to the UDRS box element matched. The interpretation fragments with their token coverage and assigned costs are sent to data store 215 and stored. This is indicated by block 326 in FIG. 4. It should also be noted, of course, that multiple rules can be applied to the same part of the UDRS.

Information in the UDRS also may be interpreted as a "Blurb". The existence of Blurbs is suggested by the results of interpreting the input DRS (or UDRS), and thus SIC 210 determines whether Blurbs are suggested by IFG 212. This is indicated by block 332. If so, service invoker 216 invokes Blurb UDRS processing engine 224 which performs Blurb processing based on the syntax parse tree or logical form and creates interpretation fragments based on that Blurb processing. The resulting interpretation fragments and their token coverage and costs are provided to IFS 215 as indicated by block 334.

Next, SIC 210 determines whether robustness strategies are to be used. Robustness strategies are described in greater detail with respect to FIG. 11 and basically include applying rewrite rules on a string basis rather than to sets of UDRS box elements, and conducting further Blurb processing. Determining whether robustness strategies are to be used is indicated by block 340.

If so, service invoker 216 invokes robustness strategy processing engine 226 in IFG 212 which creates interpretation fragments based on the robustness strategy processing. This processing includes examining the syntactic parse tree, logical form and named entities to identify items which are not in the UDRS and creating interpretation fragments from them. These interpretation fragments are created and their token coverage and costs are sent to data store 215 as indicated by block 342.

SIC 210 updates data stored in data store 215 and converts the interpretation fragments into additional patterns as indicated by block 346.

The patterns thus generated are packaged by ISS creation component 218 of SIC 210 into initial search states. This is indicated by block 348. The initial search states are packaged such that every token of the input sentence is covered by one and only one pattern. Formally, the initial search state includes a set of patterns and preferences that constrain how patterns should be assembled together. ISS creation component illustratively forms every possible initial search state for this input sentence.

Of course, initial search states can be generated in groups. For Example, the initial search states can be generated for only the patterns which resulted from applying the semantic mapping rules to the box structures of the UDRS first. Then those patterns generated from Blurb processing may be added to the process of creating initial search states. Similarly, initial search states can be generated for the patterns including those generated using the robustness strategies either exhaustively or until some other constraint is reached, such as a time limit. Alternatively, all possible search states can be generated immediately.

In any case, the initial search states that have been generated, along with the schema, are provided from SIC 210 to IA 214. This is indicated by block 350. IA 214 creates solution patterns by assembling or combining the patterns in the initial search states according to local preferences which are also provided to IA 214 as part of the initial search states. The solution patterns represent a globally most pleasant total interpretation given the schema and the local preferences. Creation of solution patterns is indicated by block 352.

IA 214 generates the solution patterns using solution pattern generation component 228. The solution patterns are provided back to SIC 210 which receives those solution patterns as indicated by block 354, and restores the box and logical structure to the solution patterns. This creates totally interpreted SemDRS's and is indicated by block 356 in FIG. 4. The box and logical structure is restored, if possible, using the saved structural information and heritage information in the solution pattern as well as the other data structures maintained by SIC 210.

FIG. 7 is a flow diagram which illustrates the initialization block 320 in greater detail. As discussed with respect to FIG. 5, each input UDRS is illustratively implemented as a dynamic array of logical elements. The logical elements are represented by the boxes and each box represents an index into the array. Thus, during initialization, data store 215 first records the box structure for the input UDRS as indicated by block 400 in FIG. 7. This is the UDRS data structure.

Next, data store 215 records a list of tokens corresponding to the input string 206. This is represented by block 402 in FIG. 7. One token list for the input string in Example 1 "Delete all emails not from KD" is as follows:

| Delete all emails not from KD | | | | | |
|---|---|---|---|---|---|
| 1 | 2 | 3 | 4 | 5 | 6 |

Data store 215 then initializes the data structure used to store the semantic mapping results generated by the IFG as indicated by block 404 in FIG. 7. It starts out empty but will eventually be populated with patterns by the results of processing in IFG 212.

A bit more detail as to what may illustratively constitute a pattern may be helpful. An entity variable which is an element of some pattern P is denoted by T(X), where T is the entity type name and X is a symbol which is unique in P. Similarly, a relation that is an element of a pattern P is denoted by T(X, S, D), where T is the relation type, X is a symbol that is unique in P, S is the symbol for the source entity and D is the symbol for the destination entity. A pattern can consist of a single entity variable such as [EmailItem (X)]. A pattern can also be represented by two or more entity variables separated by relations, such as:

EmailItem (X), HasSender (Y, X, Z), Person (Z).

Initializing the PatternList data structure is indicated by block 404.

Data store 215 then initializes the data structure which is the mapping between DRS elements in the input UDRS and the tokens in the input string 206, which will be used by subcomponents (for example, block 418 in FIG. 8) in IFG 212 to determine the token coverage of applied semantic mapping rules. This is indicated by block 406. It should be noted that some tokens do not correspond to a box element but are nonetheless represented by the box structure.

In example 1, the initial mapping of DRS elements to tokens (drselems2t) looks as follows:

KD(y) covers token 6
email(x) covers token 3
from (x,y) covers token 5
delete (e,x) covers token 1

Note that tokens 4 and 2 do not correspond to any box element. Their semantic contribution, however, is not lost because it is recorded in the box structure.

Once initialization is complete, data is made accessible by IFG 212, and schema engine 222 in IFG 212 applies all applicable semantic mapping rules to the UDRS. This process is illustrated in greater detail in the flow diagram shown in FIG. 8.

In Example 1 above, suppose that the following set of semantic mapping rules has been provided:

email(x)→EmailItem (x)
from (x,y)→HasSender (x,y)
from (x,y)→HasSentTime (x,y)
delete (e,x)→DeleteAct(e) HasTarget (e,x)

In applying these rules, UDRS semantic mapping processing engine 222 first selects a semantic mapping rule as indicated by block 410 in FIG. 8. UDRS semantic mapping processing engine 222 then compares the left side of the semantic mapping rule against all of the subsets of boxes in the recorded input UDRS box structure. UDRS semantic mapping processing engine 222 determines whether the left side of the semantic mapping rule matches any subset of the boxes in the box structure as is indicated by block 412.

If not, UDRS semantic mapping processing engine 222 simply moves on to the next semantic mapping rule and continues processing until there are no more semantic mapping rules left to be checked. This is indicated by blocks 414 and 416.

However, if, at block 412, the left hand side of a semantic mapping rule matches a subset of the box structure of the input UDRS, the token coverage of this mapping is determined as the union of the token coverage of the UDRS box elements that matched the left hand side of the selected rule, and the box number is of the one containing all matched UDRS box elements. This is indicated by block 418. Then, the SemDRS fragment on the right hand side of that selected semantic mapping rule is sent to the IFS 215 along with the token coverage, the box number and a score or cost associated with that SemDRS fragment. This is indicated by block 420. The cost can be computed using any number of known methods, such as by basing the cost on the number of words in the match, the probability of the objects in the SemDRS fragment appearing, or the cost can simply have a fixed value for all semantic mapping rules (e.g., 1.0).

Figure 9:
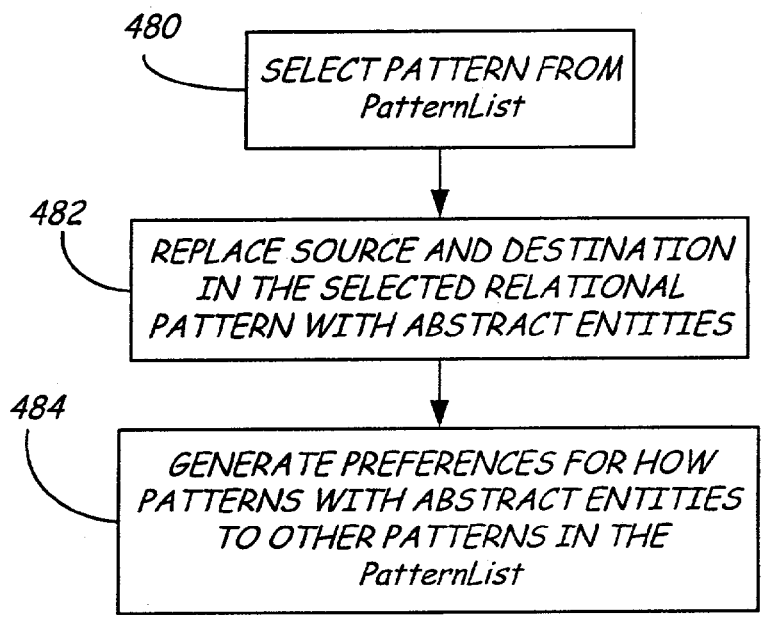
FIG. 9 is a flow diagram illustrating a loosening process in accordance with one embodiment of the present invention.

UDRS semantic mapping processing engine 222 then applies loosening and obtains preferences as indicated by block 420. In order to apply loosening, explicit connections to other patterns in the list of patterns (PatternList) are replaced by abstract entities and preferences are generated. Loosening is discussed in greater detail below with respect to FIG. 9.

After loosening is applied, a mapping between patterns and the DRS elements (the pat2drselems data structure) is updated. In order to do this, UDRS semantic mapping processing engine 222 adds a pair in the pat2drselems mapping that relates the pattern just added to the PatternList to the box in the input UDRS box structure that triggered generation of the pattern. In other words, a mapping is created between the box that matched the left side of the mapping rule and the pattern in the PatternList spawned by that match (i.e., the right hand side of the mapping rule). This is indicated by block 422.

A mapping of patterns to tokens, pat2t, based on the token coverage of the SemDRS fragments that licensed the patterns is then updated as indicated by block 424. Schema engine 222 accesses the drselem2t mapping and adds a pair in the pat2t mapping that relates the output pattern to the position in the input string. After this is completed, schema engine 222 again checks to see whether additional semantic mapping rules need to be processed as indicated by block 414.

After all of the mapping rules have been applied in Example 1, the data structures in SIC 210 are as follows:
The UDRS box structure is unchanged.
The TokenList structure is unchanged.
The PatternList structure contains the following patterns. Here, the entities and relations in each pattern are labeled with the box in the box structure into which it will eventually be reconstructed. The mapping pat2t is also specified here:
$P_1$: EmailItem [3] covers token 3
$P_2$: $E_2$[3] HasSender[5] $E_1$[1] covers token 5
$P_3$: DeleteAct [4] HasTarget [4] $E_3$[3] covers token 1
$P_7$: $E_4$[3] HasSentTime [5] $E_5$[1] covers token 5

The entities $E_1, \ldots, E_n$ in these patterns $P_1, \ldots, P_n$ are entities introduced as a result of the loosening process. That process is now described in greater detail with respect to FIG. 9.

First, a relational pattern from the pattern list data structure is selected. This is indicated by block 480 in FIG. 9. The source and destination entities in the selected relational pattern are then replaced with abstract entities (such as those represented by $E_1$-$E_n$). This is indicated by block 482.

Next, preferences for how patterns with abstract entities relate to other patterns in the PatternList data structure are generated. This is indicated by block 484.

With respect to Example 1, it can be seen that the relationship between the entities x and y in the input DRS have been loosened in the interpretation of the relation from (x, y) and the rest of the occurrences of x and y in the DRS. By doing this, it is noted that the relationship between, for example, the entity corresponding to KD(y) in the input UDRS and the designation of the HasSender relation in the schema does not have to be direct. Again, looking at the schema 300 shown in FIG. 6, this is a desirable loosening. For example, KD(y) is likely to be interpreted as a string (by the Blurb component described below) and HasSender connects EmailItems to entities of the type Person. By loosening this relationship, IA component 214 can relate the string interpretation of KD(y) to the destination of HasSender by introducing a person entity, and relating the string to that entity via the HasName relation.

It can also be seen that the relationship between the entity e in the input UDRS and the source of the HasTarget relation has not been loosened. This differs from the previous case in that the connection between E and the HasTarget relation was made explicit in a single semantic mapping rule. It is thus assumed that the right hand side of the semantic mapping rules represent legal connections in the schema, thus obviating the need for loosening.

In example 1, applying the semantic mapping rules and the loosening process (indicated by block 420 in FIG. 8) the following preferences arise (the pattern P4 is discussed with respect to Blurb processing below):

| | | |
|---|---|---|
| $H_1$: EmailItem of $P_1$ | close to | $E_2$ of $P_2$ |
| $H_2$: $E_1$ of $P_2$ | close to | Blurb ("KD") of $P_4$ |
| $H_3$: $E_3$ of $P_3$ | close to | EmailItem of $P_1$ |
| $H_4$: $E_4$ of $P_7$ | close to | EmailItem of $P_1$ |
| $H_5$: $E_5$ of $P_7$ | close to | Blurb ("KD") of $P_4$ |

After the mapping between the patterns above and the DRS elements that license them is specified (i.e., after the pat2drselems data structure is updated as indicated by block 422 in FIG. 8) that mapping looks as follows:
$P_1$: EmailItem [3] maps to email (x)
$P_2$: $E_2$[3] HasSender [5] $E_1$[1] maps to from (x,y)
$P_3$: DeleteAct[4] HasTarget [4] $E_3$[3] maps to delete (e,y)
$P_7$: E4[3] HasSentTime[5] $E_5$[1] maps to from (x,y)

This mapping actually formalizes the [] shorthand in the patterns. For example, it can be seen that email (x) occurred in box 3 of the original UDRS structure. Therefore, it is known that the UDRS corresponding to pattern $P_1$ should be reconstructed into that box.

At this point, the action of schema engine 222 in IFG 212 is completed. It should be noted that, if one chose to package the results at this point into partially interpreted SemDRS's, enough information exists. For example, two SemDRS's would result, one in which "from" is interpreted as Has-Sender and one in which this element is interpreted as HasSentTime.

Every SemDRS produced in the semantics layer is subject to a variety of well formedness constraints that ensure that interpretations that have no chance of being used are not produced. Such constraints include, for example, ruling out type inconsistencies and disfavoring interpretations that do not fit well with the particular schema being used. Such well formedness conditions allow implausible interpretations to be disfavored at any stage of the interpretation process.

Figure 10:
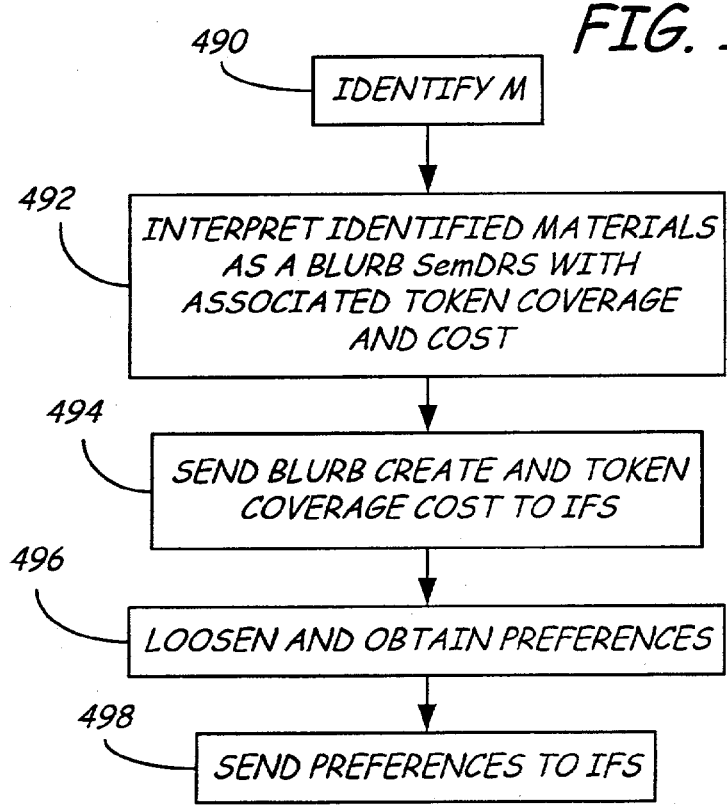
FIG. 10 is a flow diagram illustrating Blurb processing in accordance with one embodiment of the present invention.

FIG. 10 is a more detailed block diagram of Blurb processing in accordance with one embodiment of the present invention. Blurb processing takes what has yet to be interpreted in the UDRS and interprets it as a Blurb such that an interpretation fragment (and hence a pattern) can be generated for that information. In addition, alternative interpretations for certain material that has in fact given rise to SemDRS fragments are offered. For example, we may choose to create a Blurb interpretation for the utterance as a whole if we have reason to believe that it may have an interpretation as a string appropriate for a search engine.

In the present example, the only box element that has not been interpreted is KD(y), which corresponds to token 6 in the input string. In order to perform Blurb processing on this information, Blurb UDRS processing engine 224 first identifies the uninterpreted material in the input UDRS. This is indicated by block 490 in FIG. 10. The identified material is then interpreted as a Blurb pattern with an associated cost. This is indicated by block 492. The cost can be any desired cost. For example, the cost of a pattern generated using Blurb processing may be 2.0 plus 1.75 per word. Of course, any other suitable cost number can be used as well.

Once the pattern has been generated, the pat2t mapping data structure is updated as indicated by block 494. Loosening is then applied and preferences are obtained as indicated by block 496. The pat2drselems mapping structure is also updated as indicated by block 498.

After these updates have been performed, the PatternList and pat2t mapping structures now look as follows:

| | |
|---|---|
| $P_1$: EmailItem [3] | covers token 3 |
| $P_2$: $E_2$[3] HasSender[5] $E_1$[1] | covers token 5 |
| $P_3$: DeleteAct[4] HasTarget[4] $E_3$[3] | covers token 1 |
| $P_4$: Blurb ("KD") [0] | covers token 6 |
| $P_7$: $E_4$[3] HasSentTime [5] $E_5$[1] | covers token 5 |

The set of preferences looks as follows:

| | | |
|---|---|---|
| $H_1$: EmailItem of $P_1$ | close to | $E_2$ of $P_2$ |
| $H_2$: $E_1$ of $P_2$ | close to | Blurb ("KD") of $P_4$ |
| $H_3$: $E_3$ of $P_3$ | close to | EmailItem of $P_1$ |
| $H_4$: $E_4$ of $P_7$ | close to | EmailItem of $P_1$ |
| $H_5$: $E_5$ of $P_7$ | close to | Blurb ("KD") of $P_4$ |

Finally, the following pair is added to the pat2drselems mapping data structure:

| | | |
|---|---|---|
| P6: Blurb ("KD") | maps to | KD(y) |

At this point, initial search states can be generated. However, in accordance with one illustrative embodiment, the robustness strategies are implemented prior to generating initial search states. However, these strategies can be implemented either before or after an initial set of initial search states have been created, but they will be described now for the sake of completeness.

Figures 1, 11:
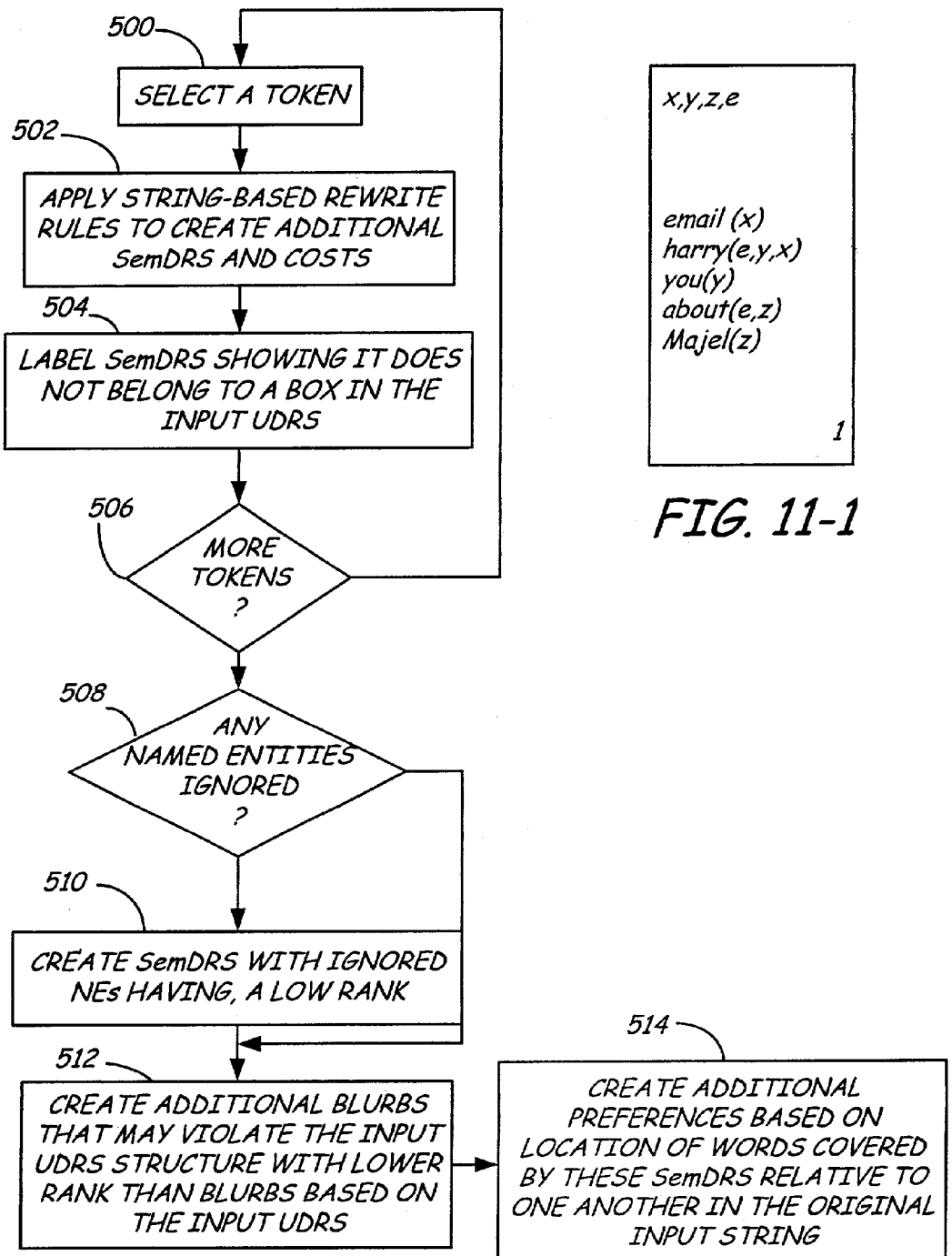
FIG. 11 is a flow diagram illustrating the implementation of robustness strategies in accordance with one embodiment of the present invention.

FIG. 11 is a flow diagram which better illustrates the implementation of robustness strategies. The robustness strategies are implemented to compensate for incorrect or fitted parses of a given sentence, or to handle input for which no suitable syntactic analysis is appropriate. For example, if the application is an information retrieval search engine, users may use incomplete sentences as search queries. In that case, some subject matter in the input string can be completely ignored in the UDRS structure. Therefore, robustness strategy processing engine 226 enumerates all linguistic evidence obtained in the parse, without the structural constraints reflected in the UDRS.

These robustness strategies can, for example, be applied to add patterns according to linguistic evidence not covered by the process of building initial search states out of the input UDRS and to then create additional search states for those patterns as alternative ways of constructing solutions in IA 214. Patterns created during implementation of the robustness strategies will illustratively be ranked lower than those created by applying semantic mapping rules to the UDRS structure and lower than those generated through Blurb processing. Therefore, the search states created from these patterns may illustratively be considered by IA 214 only if it fails to produce fit solutions according to patterns licensed by the input UDRS and Blurbs.

To better illustrate the implementation of robustness strategies, another example (Example 2) will be used. Consider an input string and token list:

| Email to Harry about Majel | | | | |
|---|---|---|---|---|
| 1 | 2 | 3 | 4 | 5 |

The input UDRS is given by FIG. 11-1.

Using the same schema as shown in FIG. 6, a set of semantic mapping rules related to this input UDRS is inferred as follows:

email (x)→EmailItem (x)

email (u,w)→InitEmailAct (u), HasTarget (u,w)

you(y)→(to be removed)

about (e,z)→HasSubject (e', z')

After the semantic mapping rules are applied to the input UDRS by IFG 212, and after Blurbs are created as suggested by the UDRS structure, the following patterns emerge.

| | |
|---|---|
| $P_1$: EmailItem [1] | covers token 1 |
| $P_2$: $E_1$[1] HasSubject [1] $E_2$[1] | covers token 4 |
| $P_3$: Blurb ("Majel") [1] | covers token 5 |
| $P_4$: Ignorable | covers token 2 |

The following preference has also been obtained:

| | | |
|---|---|---|
| $H_1$: $E_2$ of $P_2$ | close to | Blurb ("Majel") of $P_3$ |

It can be seen that the semantic mapping rule for the verb sense of "email" does not apply to the input UDRS due to the fact that the parse was incorrect. That is, it was parsed as a noun in the input UDRS instead of a verb. It can also be seen that the word "Harry" in the input sentence is recognized as a verb based on the box structure, and is represented as a relation in the input UDRS. There are no applicable semantic mapping rules and, in addition, although the UDRS structure may suggest Blurb interpretations for the material, such interpretation fragments are not appropriate for the intended final interpretation. The effect of this is that this material does not contribute to any desired final SemDRS.

The present robustness strategies, however, can assist in finding a relatively good solution. In order to implement these strategies, an ignored token is first selected as indicated by block 500 in FIG. 11. Engine 226 then applies simpler string-based rewrite rules to the selected token to create additional patterns and the associated cost. These rewrite rules can be authored by the developer or inferred from the schema. This is indicated by block 502. The resulting patterns are illustratively associated with higher initial costs than the ones created by applying the semantic mapping rules to the input UDRS.

The entities and relations created in these patterns are labeled showing that they do not belong to a box in the input UDRS. This is indicated by block 504. In the present example, the following patterns are added:

$P_5$: InitEmailAct [0] covers token 1

$P_6$: $E_3$[0] HasEmailAddr[0] $E_4$[0] covers token 1

$P_7$: $E_5$[0] HasRecipient[0] $E_6$[0] covers token 2

$P_8$: $E_7$[0] HasTarget[0] $E_8$[0] covers token 2

Engine 222 then determines whether additional tokens need to be processed. This is indicated by block 506. If so, processing returns to block 500. If not, however, then engine 226 determines whether any named entities have been ignored. This is indicated by block 508. There are substantially two cases in which a named entity may be ignored in the input URDS. First, if the named entity is compatible with the parse, but another named entity (of the same word span) is chosen by the parse, then the first named entity will be ignored. Second, if the named entity is not compatible with the parse at all, it will be ignored.

In both cases, if named entities are ignored, patterns with ignored named entities, having relatively low rank, are created. This is indicated by block 510. The present example does not have any of these named entities.

Next, certain Blurbs may violate the input UDRS structure (including Blurbs properly covering words ignored in the input UDRS structure). Blurb patterns will be created for such Blurbs based on the syntax parse tree or logical form and a heuristic that provides a lower rank than the Blurbs created by the UDRS structure. This is indicated by block 512. Such Blurbs in Example 2 are as follows:

| | |
|---|---|
| $P_9$: Blurb ("harry") [0] | covers token 3 |
| $P_{10}$: Blurb ("to harry") [0] | covers token 2, 3 |

Based on the syntax parse tree or logical form, additional preferences can also be generated. Those preferences are based on the location of words covered by these patterns relative to one another in the original input sentence. Creation of these preferences is indicated by block 514, and such preferences for the present example are as follows:

| | | |
|---|---|---|
| $H_2$: InitEmailAct of $P_5$ | close to | $E_5$ or $E_6$ of $P_7$ |
| $H_3$: InitEmailAct of $P_5$ | close to | $E_7$ or $E_8$ of $P_8$ |
| $H_4$: $E_5$ or $E_6$ of $P_7$ | close to | Blurb ("harry") of $P_9$ |
| $H_5$: $E_7$ or $E_8$ of $P_8$ | close to | Blurb ("harry") of $P_9$ |

Initial search states can then be generated using these patterns.

FIG. 12 is a flow diagram illustrating the generation of initial search states by ISS creation component 218 in SIC 210. Creation of initial search states will be described with respect to Example 1 above. It should be noted that the initial search states can be created prior to implementation of the robustness strategies, and the robustness strategies may be implemented only if necessary. Alternatively, initial search states can be created after implementation of the robustness strategies as well. In any case, the initial search states include three kinds of information:

1. A set of patterns covering the input string;
2. A map from patterns to tokens in the input string (the pat2t data structure); and
3. A set of preferences related to the patterns.

Even before the robustness strategies are implemented, this information is available, with a possible exception of a mapping from any pattern to words that were not interpreted either by a semantic mapping rule or a Blurb (such as words whose semantic content is reflected in the box structure, such as "not" and "all" in Example 1 above. Thus, if search states are created prior to robustness strategies, the search state is completed by first identifying these tokens as indicated by block 520 and adding ignorable patters to the PatternList data structure to cover the identified tokens as indicated by block 522. In Example 1, this would amount to adding the following two patterns to the PatternList:

$P_5$: Ignorable covers token 2

$P_6$: Ignorable covers token 4

Next, possible initial search states are formed from the pattern list and mappings so that all parts of the input UDRS correspond to some pattern and no part is covered by more than one pattern. This is indicated by block 524.

If the initial search states are generated prior to implementation of the robustness strategies, then all possible initial search states are formed based on the patterns in the PatternList data structure and the mappings. However, if the robustness strategies have already been implemented and initial search states are being created for those patterns as well, then the number of initial search states that could possibly be generated may be exponential. Therefore, the creation of initial search states based on patterns generated in the robustness strategies may be constrained by some other criteria, such as time.

Once the ISS generation constraint has been met (for example, once all possible search states have been generated based on patterns spawned by the input UDRS and Blurbs, and once the maximum time has been reached for initial search states generated based on patterns from robustness strategies) the initial search state generation is complete and those search states are provided to IA 214. This is indicated by blocks 526 and 528. Again, initial search states based on the patterns generated by the robustness strategies have been licensed by evidence outside of the input UDRS. Thus, they will generally be ranked lower than the other initial search states.

FIG. 13 is a flow diagram which better illustrates the overall operation of solution pattern generation component 228 in IA 214. Solution pattern generation component 228 first receives the schema and the initial search states from SIC 210. This is indicated by blocks 600 and 602 in FIG. 213. The initial search states, again, are SemDRS fragments associated with a cost, along with preferences that may lower the cost of the specific combinations of the SemDRS fragments, along with a map from the patterns to tokens in the input string (i.e., pat2t).

Solution pattern generator 228 then performs a heuristic search of the initial search states to obtain solution patterns. This is an optimization problem in which generator 228 attempts to assemble the patterns into a solution pattern, according to the preferences provided, at the lowest cost. This search is indicated by block 604 in FIG. 13.

The result of the search produces a sequence of solution patterns ranked by increasing cost. The cost is a function of the choice of fragments, the proximity of these fragments to one another in the schema, as well as satisfaction of the preferences provided. Production of the solution patterns is indicated by block 606.

IA 214 then invokes DRS structure restoration generator 220 in SIC 210. Generator 220 restores the box structure to the solution patterns to create totally interpreted SemDRS's. This is indicated by block 608.

The box structure for the solution patterns is restored by accessing the mapping of the patterns used in the solution pattern to the input UDRS box structure. Those patterns, if possible, are placed in the same box structure as that found in the input UDRS.

Figure 14:
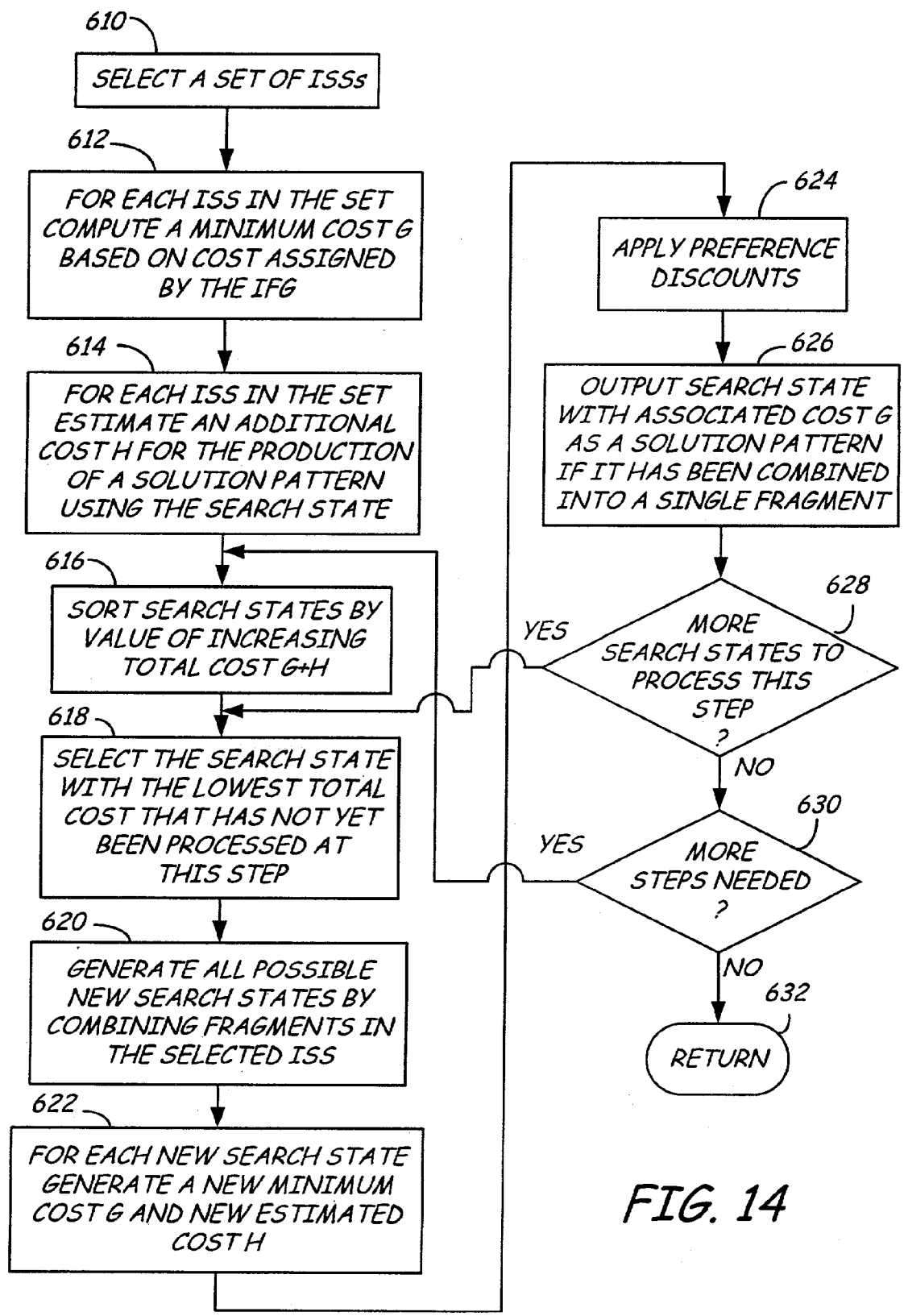
FIG. 14 is a more detailed flow diagram illustrating the search of initial search states to obtain solution patterns.

FIG. 14 is a flow diagram that further illustrates implementation of the heuristic and solution pattern generator 228. In one illustrative embodiment, the heuristic is a variant of the known A* algorithm. Briefly, generator 228 first selects a set of initial search states as indicated by block 610. For each initial search state in the set, the minimum cost G is computed based on the cost assigned to the patterns in the initial search state by IFG 212. This is indicated by block 612. Then, for each initial search state in the set, the additional cost H for production of a solution using the search state is estimated. This is indicated by block 614. The search states are then sorted by value of increasing total cost G+H. This is indicated by block 616.

Once the search states are initially sorted in this fashion, the search state with the lowest total cost, that has not yet been processed at this step, is selected. This is indicated by block 618. From the selected search state, all possible new search states are generated by combining fragments in the selected search state in different ways. This is indicated by block 620 and is discussed in greater detail with respect to FIG. 15. For each of the new search states generated in block 620, a new minimum cost G' and a new estimated cost H' is computed. This is indicated by block 622. Based on the fragment combinations, discounts that are associated with each of the applicable preferences is applied as indicated by block 624.

The preference offers a discount to any potential solution in which certain interpretation fragments occur in a certain arrangement (as specified by the preference). The presence of the preference reflects linguistic evidence and ensures that a solution that is in accordance with the linguistic evidence is ranked before others. It should be noted that the discounts are applied during generation of the solution patterns, rather than to the solution patterns as a whole after they have been generated. Examples of preferences which can be used include:

1. Strong source/destination preferences. In this exemplary preference, if both the linguistic evidence and the schema indicate that a fragment should appear on the source or destination side of another fragment, and it does, then this preference has been applied and a discount (of, for example, 0.75) is administered to that solution pattern.
2. Weak source/destination preference. If only the linguistic evidence indicates that one fragment should appear on the source or destination side of the other fragment, and it does, then this preference applies and gives a discount (of, for example, 0.5).
3. A proximity preference. The schema or linguistic evidence shows that two fragments should end up as close as possible to one another, and they do. This preference applies and gives a discount (of, for example, 0.25).

Once the preferences are applied, then solution pattern generator 228 determines whether any solution patterns have been completed. A search state is output, with its associated cost G', as a solution pattern if all fragments in the search state have been combined or unified into a single fragment. This is indicated by block 626.

Processing then continues to block 628 where generator 228 determines whether there are more search states to process at this step. If so, processing returns to block 618 and the search state with the next lowest total cost that has not been processed at this step is selected.

If, at block 628, there are no further search states to process at this step, then generator 628 determines whether there are still search states left which need to be processed (i.e., whether there are still search states which have not been completely combined into one fragment to form a solution pattern). This is indicated by block 630. If such search states exist, then processing returns to block 616 where the remaining search states are sorted by value of increasing total costs G'+H' and they are again processed, lowest cost first. Once all of the search states have been completely processed, solution pattern generation is completed as indicated by block 632.

It should also be noted that, for long sentences and ambiguous semantic mappings, the number of initial search states can be undesirably large. This can result in a prohibitively long processing time to set these search states up, and only a relatively few of them can actually be explored. Thus, search states can be further limited by only generating those which correspond to interpretations of the input UDRS elements that show a relatively close proximity in the application schema. Solutions achieved from these initial search states may not necessarily be the cheapest solutions that can be found, but they are likely to be the cheapest. Further, this limitation may illustratively be only applied where the input sentences are undesirably long. Thus, these constraints may illustratively not even be implemented for sentences of reasonable length.

Figure 15:
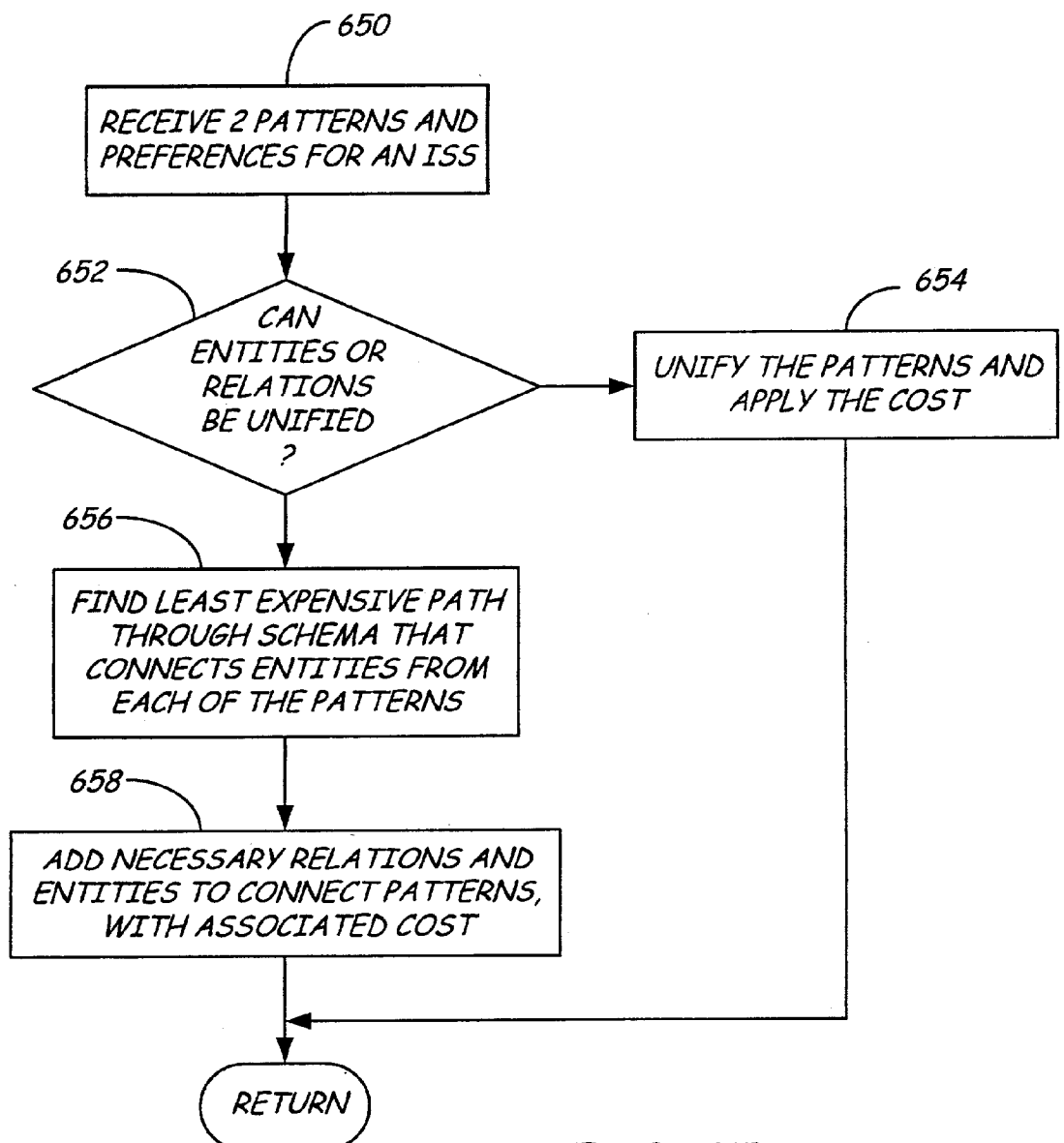
FIG. 15 is a high level flow diagram illustrating how patterns are combined or unified to obtain solution patterns.

FIG. 15 is a flow diagram that generally illustrates how patterns are combined in solution pattern generator 228 of IA 214. In order to combine patterns or fragments of an initial search state, solution pattern generator 228 first receives two patterns and their associated preferences for an initial search state, along with the schema. This is indicated by block 650 in FIG. 15. Generator 228 then determines whether entities or relations in the patterns can be unified. This is indicated by block 652. For example, assume the patterns are as follows:
P1=entity 1, relation 1, entity 2; and
P2=entity 3, relation 2, entity 4.

Entities 2 and 3 are unifiable if entities 2 and 3 are identical, or if one is a transitive subtype of the other.

If so, this yields a combined pattern as follows:
Entity 1, relation 1, unified entity 2/3, relation 2, entity 4.

Relations are unifiable if they have the same type, if their sources can be unified, and if their destinations can be unified.

In any event, if entities or relations in the two chosen patterns can be unified as illustrated at block 652, then the patterns are unified and a cost can be applied, if desired. In the illustrative embodiment, the cost for unifying patterns or relations is 0. This is indicated by block 654.

If, at block 652, the entities or relations in the received patterns can not be unified, then solution pattern generator 228 finds the least expensive path through the schema that connects an entity from each of the patterns. This is indicated by block 656. The costs of each of the paths in the schema can be precomputed. Of course, they can also be computed at run time. If the cost for two paths are the same, then the shortest path is illustratively chosen as the least expensive path.

Once the least expensive path has been identified in block 656, generator 228 adds necessary relations and entities to connect the two patterns according to the schema and applies the associated cost to the new connected pattern. This is indicated by block 658.

As indicated with respect to FIG. 14, the newly combined patterns are then scored and sorted by score, and the combination and unification continues until the search state is represented by a single fragment, in which case it is a solution pattern. Because of the constant scoring and sorting, IA 214 is ensured of providing the highest ranked (least expensive) solution patterns first.

It can thus be seen that the present invention normalizes a DRS to a normalized data structure usable, as an input, in a semantic analysis system.

Although the present invention has been described with reference to particular embodiments, workers skilled in the art will recognize that changes may be made in form and detail without departing from the spirit and scope of the invention.

Notes

Once the elements of a box have been sorted according to $<_a$ (Step 3) or $<_b$ (Step 12), this fact can be recorded in an additional field of the box implementation, so that if the same box is encountered more than once, the sorting algorithm need not be applied again.

The present algorithm modifies the input DRS so that it is normalized. If the algorithm were modified to instead output a normalized copy of the input DRS, the used_ boxes vector could be eliminated. Its only purpose is to store the boxes as they are being copied, in order to avoid a box being overwritten before it has been copied. The order in which box elements are copied guarantees that any box element that gets overwritten either has already been copied, or should be discarded.

What is claimed is:

1. A method, implemented at least in part by a computing system, of normalizing a discourse representation structure (DRS) that includes boxes with box elements and box element arguments having markers, box identifiers and data values, the method comprising:
    receiving the DRS;
    normalizing a form in which boxes and box elements are represented in the DRS by deleting unused boxes from the DRS;
    sorting the boxes and box elements, based on the box and box element normal form and regardless of the markers, to obtain a preliminary ordering;
    normalizing a form in which markers are represented in the DRS;
    sorting the boxes and box elements based on the preliminary ordering and based on the marker normal form, to generate a DRS in a normal form; and
    providing an output comprising the DRS in the normal form.

2. The method of claim 1 wherein normalizing the form in which box elements are represented comprises:
    deleting unused box elements from the DRS.

3. The method of claim 2 wherein normalizing the form in which boxes are represented comprises:
    re-numbering the boxes with consecutive indices.

4. The method of claim 3 wherein normalizing the form in which box elements are represented comprises:
    re-numbering the box elements with consecutive identifiers.

5. The method of claim 4 wherein sorting the boxes and box elements, based on the box and box element normal forms and regardless of the markers, comprises:
    lexicographically ordering the boxes and box elements based on the indices and identifiers to obtain lexicographically ordered boxes and box elements.

6. The method of claim 5 wherein sorting the boxes and box elements, based on the box and box element normal forms and regardless of the markers, comprises:
    updating the boxes to refer to re-numbered box elements.

7. The method of claim 6 wherein sorting the boxes and box elements, based on the box and box element normal forms and regardless of the markers, comprises:
    updating the box elements to refer to re-numbered boxes.

8. The method of claim 7 wherein normalizing the form in which markers are represented in the DRS comprises:
    generating a mapping between each marker and a list identifying a box and box element containing the marker.

9. The method of claim 8 wherein normalizing the form in which markers are represented in the DRS comprises:
    generating an inverse mapping between the list identifying a box and box element containing a marker and each marker.

10. The method of claim 9 wherein normalizing the form in which markers are represented in the DRS comprises:
    re-numbering the markers with consecutive marker values.

11. The method of claim 10 wherein normalizing the form in which markers are represented in the DRS comprises:
    updating the box elements to refer to the re-numbered markers.

12. The method of claim 11 wherein sorting the boxes and box elements based on the preliminary ordering and based on the marker normal forms comprises:
    sorting the lexicographically ordered boxes and box elements based on the re-numbered markers to obtain a normalized DRS.

13. The method of claim 12 and further comprising:
    generating a string representative of the normalized DRS.

* * * * *